(12) United States Patent
Kuyken et al.

(10) Patent No.: US 11,761,884 B2
(45) Date of Patent: Sep. 19, 2023

(54) PHOTOACOUSTIC TRANSDUCER

(71) Applicants: UNIVERSITEIT GENT, Ghent (BE); IMEC VZW, Leuven (BE); VMICRO SAS, Villeneuve d'Ascq (FR); CNRS, Paris (FR); ISEN YNCRÉA HAUTS-DE-FRANCE, Lille (FR); UNIVERSITÉ DE LILLE, Lille (FR); ECOLE CENTRALE DE LILLE, Villeneuve-d'Ascq (FR); UNIVERSITÉ POLYTECHNIQUE HAUTS-DE-FRANCE, Valenciennes (FR)

(72) Inventors: Bart Kuyken, Ghent (BE); Mathias Vanwolleghem, Melle (BE); Mattias Verstuyft, Brussels (BE); Benjamin Walter, Lille Hellemmes (FR); Jean-Francois Lampin, Templeuve (FR)

(73) Assignees: VMICRO SAS, Villeneuve d'Ascq (FR); UNIVERSITEIT GENT, Ghent (BE); CNRS, Paris (FR)

( * ) Notice: Subject to any disclaimer, the term of this patent is extended or adjusted under 35 U.S.C. 154(b) by 232 days.

(21) Appl. No.: 17/310,242

(22) PCT Filed: Jan. 27, 2020

(86) PCT No.: PCT/EP2020/051960
§ 371 (c)(1),
(2) Date: Jul. 27, 2021

(87) PCT Pub. No.: WO2020/157022
PCT Pub. Date: Aug. 6, 2020

(65) Prior Publication Data
US 2022/0276149 A1 Sep. 1, 2022

(30) Foreign Application Priority Data
Jan. 28, 2019 (EP) .................................... 19154066

(51) Int. Cl.
*G01N 21/17* (2006.01)

(52) U.S. Cl.
CPC . *G01N 21/1702* (2013.01); *G01N 2021/1704* (2013.01); *G01N 2201/06113* (2013.01)

(58) Field of Classification Search
CPC .......... G01N 21/1702; G01N 21/1704; G01N 21/1706; G01N 21/00; G01N 2021/1704; G01N 2201/06113
See application file for complete search history.

(56) References Cited

U.S. PATENT DOCUMENTS 6,146,330 A * 11/2000 Tujino ................ G01S 7/52038
600/458
7,263,871 B2 9/2007 Selker et al.
(Continued)

FOREIGN PATENT DOCUMENTS

WO 2009064577 A1 5/2009
WO 2011109557 A1 9/2011

OTHER PUBLICATIONS

Borri et al., "Intracavity Quartz-Enhanced Photoacoustic Sensor," Applied Physics Letters, vol. 104, Mar. 4, 2014, 4 Pages.
(Continued)

*Primary Examiner* — Suman K Nath
(74) *Attorney, Agent, or Firm* — WORKMAN NYDEGGER

(57) ABSTRACT

An integrated photoacoustic transducer, sensing system and method for assisting in sensing a concentration of a species in a fluid such that the integrated photoacoustic transducer includes a waveguide structure. The waveguide structure has an optical resonance spectrally overlapping a spectral absorption line or band of the species. The photoacoustic transducer includes at least one acoustic cavity formed in a portion of the waveguide structure and configured for receiving the fluid for sensing comprising the species. The at least one acoustic cavity has an acoustic resonance spectrally overlapping with a harmonic of a modulation frequency. At least one acoustic transducer comprising a deformable mechanical portion is included in the photoacoustic transducer. The deformable mechanical portion is in direct acoustic communication with the at least one acoustic cavity and has an adjustable mechanical resonance, which
(Continued)

can be brought into spectral overlap with an acoustic resonance of the least one acoustic cavity.

23 Claims, 7 Drawing Sheets

(56) References Cited

U.S. PATENT DOCUMENTS

| | | |
|---|---|---|
| 8,723,277 B2 | 5/2014 | Dehe et al. |
| 2008/0121018 A1* | 5/2008 | Schopp .............. G01N 21/1702 |
| | | 73/24.06 |
| 2010/0192669 A1* | 8/2010 | Presura .............. G01N 21/1702 |
| | | 73/23.3 |
| 2018/0284012 A1* | 10/2018 | Marta ................ G01N 21/1702 |
| 2020/0386718 A1* | 12/2020 | Singh ................... A61B 5/0095 |

OTHER PUBLICATIONS

Zhao et al., "Enhanced Photoacoustic Detection using Photonic Crystal Substrate," Applied Physics Letters, vol. 104, No. 16, Apr. 23, 2014, 5 Pages.

Extended European Search Report from corresponding European Application No. EP19154066.5, dated Jul. 11, 2019.

International Search Report and Written Opinion from PCT Application No. PCT/EP2020/051960, dated Apr. 29, 2020.

* cited by examiner

PHOTOACOUSTIC TRANSDUCER

FIELD OF THE INVENTION

The present invention relates to the field of photoacoustic cells and transducers, in particular to photoacoustic transducers for sensing gas absorption lines in the terahertz region.

BACKGROUND OF THE INVENTION

Photoacoustic sensing of a species in a fluid provides a very sensitive sensing technique, which is used for instance in explosive trace gas environments.

Traditional photoacoustic absorption spectroscopy (PAS), as disclosed in U.S. Pat. No. 7,263,871, implements a cell for sensing with extended acoustic cavities, typically several millimeters of length, for enhancing the light-induced sound wave detected by an acoustic transducer, e.g. a microphone. A resonance frequency for such relatively long acoustic cavities is on the order of only a few kilohertz and are thus prone to capture a large amount of background noise. Additional quarter-wave buffers are needed to remedy the noise ingress.

In quartz-enhanced photoacoustic absorption spectroscopy (QEPAS) the acoustic energy is primarily accumulated by the acoustic transducer, which typically is provided by a quartz tuning fork, such that the generation and accumulation of acoustic signals can be confined to a smaller volume in space not requiring an extended acoustic cavity. QEPAS operates at high acoustic frequencies, e.g. 32 kHz for a typical quartz tuning fork, for which a good rejection of acoustic background noise is obtained.

QEPAS, combined with a micro-resonator arrangement, has been reported, for instance in WO 2011/109557, demonstrating an increase in the detectable signal by periodically reflecting the light-induced light wave multiple times inside the micro-resonator arrangement. However, the presence of the micro-resonator arrangement may lead to additional light losses due to clipping of the light beam by the limited aperture of the micro-resonators.

Both conventional PAS cells for sensing and QEPAS can be configured for providing an optical mirror cavity around the cell or the tuning fork for further enhancing a circulating light signal which is repeatedly absorbed by the sensed analyte, thereby generating sound waves, e.g. Borri et al. "Intracavity quartz-enhanced photoacoustic sensor", Applied Physics Letter 104, 091114 (2014). A disadvantage of such systems is that they require a precise positioning control of the tuning fork or acoustic resonator along the beam path in the cavity, using micromechanical actuated positioning stages, which limits mechanical handling, alignment speed and robustness of such systems. Moreover, the optical cavity is also exposed to environmental noise influences, which requires a constant feedback signal for cavity alignment. However, high voltages driving the mirror actuators are undesirable in explosive environments. The resonant light in such cavities is confined to a relative large mode volume in air, limiting the achievable limit of detection.

Photoacoustic gas sensing in the mid-infrared has been studied. However, no good photoacoustic gas sensing device exists for the terahertz region, for which rotational transitions between molecular energy levels are directly observable spectroscopic variables. One of the reasons is that most currently available terahertz sources do not provide sufficient output power.

Therefore, there is room for improvement for compact, but sensitive photoacoustic transducers, in particular in applications using the terahertz band.

SUMMARY OF THE INVENTION

It is an object of embodiments of the present invention to provide sensitive photoacoustic transducers and photoacoustic sensing systems for assisting in sensing concentrations of an analyte species in a fluid. The photoacoustic transducers and photoacoustic sensing systems according to the present invention are adapted for sensing with radiation signals that are located in the terahertz region of the electromagnetic spectrum and are also suitable for being used at room temperatures without the need of being cooled.

The above objective is accomplished by a method and devices according to the present invention.

According to embodiments of the invention, an integrated photoacoustic transducer for assisting in sensing a concentration of a species in a fluid is provided, which comprises a waveguide structure and at least one acoustic transducer. The waveguide structure is configured as an optical resonator for enhancing, when received, a radiation signal, modulated at a modulation frequency. At least one acoustic cavity is formed in a portion of the waveguide structure and is configured for receiving the fluid for sensing, which is comprising the species at said concentration, so that the fluid can be heated by irradiating it with the enhanced radiation signal, thus generating an acoustic signal. The at least one acoustic transducer comprises a deformable mechanical portion, which is in direct acoustic communication with the at least one acoustic cavity and which has an associated mechanical resonance. The sensed species interacts with radiation by absorption in at least one spectral region. The spectral region can comprise one or more spectral absorption lines, one or more spectral absorption bands, or combinations thereof. The at least one spectral region of absorption of radiation by the sensed species overlaps with at least one optical resonance associated with the waveguide structure and the at least one acoustic cavity has at least one associated acoustic resonance which is spectrally overlapping with a harmonic of the modulation frequency. The mechanical resonance is adjusted to spectrally overlap with an acoustic resonance associated with the at least one acoustic cavity, or the at least one acoustic transducer comprises means for adjusting the mechanical resonance or for allowing the mechanical resonance to be adjusted over a spectral range that is including points of spectral overlap with an acoustic resonance associated with the at least one acoustic cavity when the photoacoustic transducer is in use for assisting in sensing said concentration of said species.

According to some embodiments, the mechanical resonance of the deformable portion is adjusted to spectrally overlap with an acoustic resonance of the at least one acoustic cavity. This adjustment may be achieved during fabrication. Alternatively, the adjustment may be achieved in a post-fabrication adjustment step, based on the acoustic transducer means for allowing the mechanical resonance to be adjusted. Accordingly, in some embodiments of the present invention, the at least one acoustic transducer comprises means for allowing adjusting the mechanical resonance associated with the deformable portion during fabrication, testing, or before use of the integrated photoacoustic transducer. Such adjustment means may comprise mass redistribution structures which are pre-formed on a surface of the deformable portion and which are configured for removal, for example pre-formed perforated regions and/or mechanical loads disposed on a surface of the deformable portion (e.g. perforations via etching, drilling, laser ablation and mechanical loads via selective growth by deposition, bonding, transfer-printing) that can be removed to alter the mechanical properties of the deformable portion.

According to other embodiments, the mechanical resonance of the deformable portion is adjusted or not adjusted to spectrally overlap with an acoustic resonance of the at least one acoustic cavity when the photoacoustic transducer is not in use for assisting in sensing the concentration of the species. However, the at least one acoustic transducer comprises means for adjusting the mechanical resonance so that it spectrally overlaps an acoustic resonance of the at least one acoustic cavity when the photoacoustic transducer is in use for assisting in sensing the concentration of the species. Such adjustment means may comprise active frequency tuning of the deformable portion by electronically controlled capacitive actuation, electronically controlled electrodeposition, light-controlled stiffness reconfiguration of photoresponsive material layers extending on a surface of the deformable portion. In some embodiments of the invention, the adjustment means may thus comprise actively controlled and reversable changes of metallic concentration, or the growth of metallic dendritic structures, in a solid electrolyte disposed on a surface of the deformable portion between electrically biased, metallic anode and cathode. Alternatively, in some other embodiments of the invention, the adjustment means may comprise a segmented deformable portion with independently controllable electrodes arranged in a first and a second segment of the deformable portion, wherein the electrode(s) of the first segment are configured for capacitively actuating the deformable portion to deflect into a bias position and the electrode(s) of the second segment are configured for capacitively sensing deflections of at least the second segment of the deformable portion with respect to the bias position. The first segment may correspond to an outer ring-shaped region of the deformable portion and the second segment to the circular inner region of the deformable portion. The deformable portion may be a suspended membrane which is deflectable in respect of a further reference electrode arranged on a backplate of the at least one acoustic transducer.

It is an advantage of embodiments of the present invention that a threefold enhancement for the readout signal relating to the species to be sensed can be achieved by the synergetic effect of optical, acoustic and mechanical resonance(s) being excited within the same device. This threefold enhancement may advantageously lower the limit of detection for a species to be sensed.

According to some embodiments of the present invention, the at least one acoustic transducer may comprise a membrane as deformable mechanical portion. The membrane may be mechanically coupled to an opening of the at least one acoustic cavity, thereby closing the open portion and providing a reflective portion of the boundary. The membrane may be provided as a perforated or semi-permeable membrane, which allows for or improves receiving the fluid for sensing.

The deformable mechanical portion of the at least one acoustic transducer may be planar or corrugated. The deformable mechanical portion of the at least one acoustic transducer may comprise silicon nitride as a material or aluminum nitride as a material.

In other embodiments of the present invention, the membrane may be part of a MEMS microphone. Such embodiments may benefit from the very mature technology field of precisely tunable and very sensitive MEMS microphones.

In particular embodiments of the present invention, the at least one acoustic transducer may comprise two membranes which are mechanically coupled to one of the at least one acoustic cavity at opposite end portions thereof or are mechanically coupled to opposite end portions of two different acoustic cavities, the two different acoustic cavities preferably being distantly separated by less than a wavelength of the at least one acoustic resonance associated with one or both of the two different acoustic cavities.

It is an advantage of these embodiments that background acoustic signals can be efficiently rejected by detecting differential excitations of the at least one acoustic transducer.

The at least one acoustic cavity may be provided as a defect hole of a photonic crystal structure formed within the waveguide structure. A strong enhancement and confinement of the received radiation signal may be achieved in photonic crystal structures, which allows for an improved conversion efficiency between received radiation energy and internal molecular excitation of the species to be sensed.

The waveguide structure may be partially suspended or may comprise a high-resistance silicon material. This allows for good confinement and low absorption losses in embodiments of the invention which are configured for receiving a radiation signal in the terahertz region.

The integrated photoacoustic transducer may receive a modulated radiation signal which is located in the terahertz region. For such embodiments it is advantageous that the terahertz frequency of the received radiation signal, the mechanical resonance frequency and the acoustic resonance frequency are all of the same order of magnitude.

Furthermore, a beneficial effect residing in the fast modulation of the radiation signal, which is received by the integrated photoacoustic transducer, is that the bulk of the waveguide structure may not be capable of following the corresponding, fast temperature changes caused by heating of the fluid for sensing such that the refractive index of the waveguide structure is not affected by said fast modulation.

The integrated photoacoustic transducer and the photoacoustic sensing system including the same may be operated at room temperature. A low-power terahertz radiation source may be used for generating the modulated radiation signal which is coupled into the waveguide structure of the integrated photoacoustic transducer.

The integrated photoacoustic transducer may be provided as a terahertz photonic circuit die.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
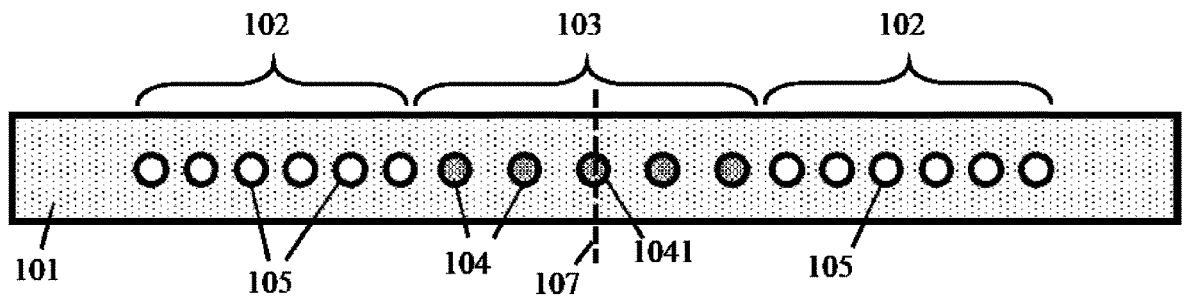
FIG. 1 shows schematically an integrated photoacoustic transducer for assisting in sensing a species in a fluid, according to one embodiment of the present invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

In the context of the present invention, "detected species or analytes" typically represent trace gas molecules and photoacoustic absorption typically takes place in the gaseous phase. This is the preferred phase for terahertz absorption in polar gases, which exhibit a series of sharp purely rotational absorption features (e.g. unbroadened or broadened absorption lines) in this spectral range. The rotational absorption lines may then serve as fingerprint for the purpose of identifying trace gases in a gas mixture, e.g. in air. However, the present invention should not be construed as being limited to photoacoustic absorption in the gas phase only; absorption may also take place in the liquid phase, but sharp absorption lines will be significantly broadened. It is also possible to investigate terahertz absorption characteristics of non-polar liquids if the sensitivity of the photoacoustic detector suffices to reveal the very small absorption cross-sections.

Hence, in the context of the present invention, a "fluid" shall be considered to include both the gaseous phase and the liquid phase.

When sensing concentrations of a species or an analyte in a fluid, it is understood that a sensed concentration also determines whether this species/analyte is present in the fluid sample volume. In this regard, a sensed concentration for the species/analyte below an established threshold concentration is to be interpreted as a detected absence of the sensed species/analyte in the fluid sample volume. Similarly, a sensed concentration for the species/analyte above the established threshold concentration is to be interpreted as a detected presence of the sensed species/analyte in the fluid sample volume. Establishing a meaningful threshold concentration may be accompanied by gathering of supporting experimental evidence and the established threshold concentration is of relative nature depending on the particular device and operating environmental conditions.

Hereinafter, a "transducer" is considered as a device or apparatus which converts the underlying energy form by which an applied physical signal is conveyed in the first place into another energy form for representing the physical signal. In this regard, an acoustic transducer is converting a physical signal conveyed by pressure waves into a signal characterized by a different form of energy, for instance into a voltage signal conveying electrostatic or electrodynamical energy or into a shear wave conveying elastodynamical energy.

An acoustic signal refers to pressure waves propagating in the fluid.

"Terahertz radiation" is the spectral band that bridges the gap between the extreme microwave spectral region and the far-infrared spectral region. It is typically defined as radiation with wavelengths in the range between 3 millimeter and 30 micrometer, or, in terms of frequency, as radiation with frequencies in the range between 0.1 THz and 10 THz (i.e. spanning two decades). Although preferred embodiments of the present invention are adapted to work in the terahertz region, other embodiments can be adapted to work in a different wavelength region, e.g. in the visible or infrared region.

"Harmonics" or "a harmonic of a signal frequency", if not explicitly stated otherwise, also includes the fundamental frequency being the signal frequency itself, also referred to as first harmonic or first-order harmonic. In this respect, higher-order harmonics do not include the fundamental frequency, but start with the second-order harmonic.

A "membrane", in the context of the present invention, designates any material layer portion with a large geometrical size-to-thickness aspect ratio, i.e. any material layer portion which is much thinner compared to a characteristic length of the surface area over which it is extending. The terms "membrane" and "diaphragm" are used interchangeably. A "membrane" is typically anchored at its periphery, but may be a "partially suspended membrane" if only a portion of its periphery is anchored to a surrounding mechanical support structure. Hence, a thin material layer portion is termed "a membrane" although, in some circumstances, its elastic material properties or degree of tension would be more adequately reflected by wordings like diaphragm, membrane-like, plate-like, or a combination thereof. An example of a "membrane" which has plate-like elastic material properties, is a thin metal sheet portion or a thin material layer portion that has significant stiffness. For embodiments of the present invention, a thickness value of the membrane or diaphragm may be as low as tens of nanometer, but may also reach up to and including about one micrometer. A "membrane" may be perforated or loaded, e.g. mass-loaded on at least a portion of its surface.

An "integrated" photoacoustic transducer (device), for embodiments of the invention, refers to a device that comprises at least a waveguide structure, comprising an acoustic cavity formed therein, and at least one acoustic transducer on a single substrate.

A "substrate" refers to a material or a material combination that forms a physical supporting basis for the incorporation, inclusion, attachment, or deposition of additional materials on or within the substrate materials, and for the exclusion, removal or modification of already existing materials in the substrate. More than one substrate can be combined into new substrate. In the embodiments of the invention, the substrate may be that of a photonic circuit die; the substrate may comprise silicon. The photonic circuit die may be obtained as a portion of a larger wafer which has been diced, cut, sliced or otherwise divided into smaller pieces.

An object is in "direct acoustic communication" with an acoustic cavity if acoustic wave signals generated within that acoustic cavity can freely propagate towards and reach the object upon which they are incident. This free propagation of acoustic wave signals towards the object is following an acoustic pathway along which the acoustic wave signals are not altered by absorption and re-emission or by conversion into other signal forms. In embodiments of the invention, the object being in "direct acoustic communication"

with an acoustic cavity is preferably arranged in a way such that the free propagation of acoustic wave signals towards the object is following straight line acoustic pathway, that is acoustic wave signals are propagating towards the object without being deflected in their direction of propagation. In some embodiments of the invention, however, the object being in "direct acoustic communication" with an acoustic cavity may be arranged in a way such that the free propagation of acoustic wave signals towards the object implies a small number of reflections on walls before reaching the object, for instance not more than five reflections or not more than three reflections or not or than one reflection. In embodiments of the invention, the object being in "direct acoustic communication" with an acoustic cavity preferably forms part of a reflective boundary of that acoustic cavity, reflecting back a portion of the received acoustic signal. This means the object being in "direct acoustic communication" with an acoustic cavity may be partially enclosing that acoustic cavity. In some embodiments of the invention, however, the object being in "direct acoustic communication" with an acoustic cavity may be spaced away from that acoustic cavity, for example, by leaving an air gap between the object and that acoustic cavity. Therefore, the object can be in "direct acoustic communication" with an acoustic cavity via an air gap such that that acoustic cavity is partially open over a portion of its physical boundary and is interfacing the air gap. Although a fraction of the acoustic wave signals generated within that acoustic cavity may be reflected off the air gap interface, it is understood that another fraction of the acoustic wave signals generated within that acoustic cavity escape from therefrom and freely propagate towards and reach the object. An air gap separating the object being in "direct acoustic communication" with an acoustic cavity may be of small physical dimensions, for instance may bridge a distance between the object and that acoustic cavity which is inferior to one acoustic wavelength corresponding to the acoustic wave signals generated within that acoustic cavity.

A "resonance" in a spectrum of a resonating body, system or device, here referred to as the resonator, relates to the phenomena of amplifying the resonator response, e.g. oscillation amplitude, when excited by a periodic driving force acting on the resonator with frequency at or close to a natural frequency of the resonator. A sharp resonance line in the spectrum may be intrinsically or externally broadened to have a specific linewidth associated with it. A spectral overlap with a resonance line is thus not restricted to an overlap only with or including the peak/maximum of the line, but also includes overlap with wing portions of the resonance line.

Photoacoustic absorption spectroscopy exploits the phenomena of heating of a fluid (e.g. a liquid or gaseous medium) by absorption of light at the absorption site. The heated fluid expands subsequently, thereby generating a pressure wave. If the light is absorbed in a periodical fashion by the analyte/species used for sensing, e.g. by modulating an intensity or a wavelength detuning of an incident radiation signal, pressure waves are also generated periodically and propagate as acoustic (sound) waves through the fluid. An acoustic detector or pressure transducer, e.g. a microphone, may then pick up the acoustic wave signals and convert them into an electrical signal. Under a very wide range of conditions an amplitude of the acoustic wave signals will be directly proportional to the concentration of the sensed species.

In a first aspect the invention relates to an integrated photoacoustic transducer which is configured to enhance a signal relative to a characteristic optical absorption feature of an analyte species in a fluid, such as isolated or grouped absorption lines or absorption bands, or superimpositions or combinations thereof, a concentration of which species is to be sensed. The integrated photoacoustic transducer comprises a waveguide structure that is configured as an optical resonator. The optical resonator is enhancing a received radiation signal which is modulated at a modulation frequency. At least one acoustic cavity is formed in a portion of the waveguide structure and is configured for receiving a fluid for sensing which comprises a concentration of the species to be sensed. This concentration may be a "zero" measurable concentration if the species is absent. The at least one acoustic cavity is also configured for receiving a fluid for sensing in such a way that the received fluid can be heated by irradiating it with the enhanced received radiation signal, thus generating an acoustic signal in the at least one acoustic cavity. The integrated photoacoustic transducer also comprises a deformable mechanical portion that is in direct acoustic communication with the at least one acoustic cavity. The waveguide structure is having at least one associated optical resonance which is spectrally overlapping with a spectral absorption region of the sensed species, the at least one acoustic cavity is having at least one associated acoustic resonance which is spectrally overlapping with a harmonic of the modulation frequency, and the deformable mechanical portion of the at least one acoustic transducer is having an adjusted mechanical resonance which has been brought into spectral overlap with an acoustic resonance associated with the at least one acoustic cavity.

FIG. 1 shows a preferred embodiment of a photoacoustic transducer providing a threefold resonant waveguide structure 101. Triple enhancement through optical, acoustic and mechanical resonance of a detected absorption signal therein, is providing a compact, fully integrated photoacoustic transducer for PAS having improved sensitivity. Equation Eq. 1 gives an expression for the sensitivity S of the threefold resonant photoacoustic transducer, wherein $c_{sens}$ is the concentration of the sensed species (at a given temperature and pressure), a is the optical absorption coefficient per unit length for the optical transition used for sensing the target species, L is the effective absorption pathlength within the optical resonator, P is the injected optical power, Q is the overall enhancement factor (e.g. the product of a mechanical quality factor relating to a structural resonance of the acoustic transducer, an optical quality factor relating to a resonance of the optical resonator, and an acoustic quality factor relating to a resonance of the acoustic cavity), f is the structural resonance frequency of the acoustic transducer and V the sensing volume for the photoacoustic transducer.

$$S \propto \frac{\alpha L c_{sens} Q P}{f V} \quad (1)$$

The waveguide structure 101 comprises reflecting means 102, arranged at two opposite end portions thereof, which are functioning as two reflectors of a resulting optical resonator. Guided radiation (e.g. infrared or terahertz radiation), propagating along an axial direction of the waveguide, is reflected multiple times by the reflecting means 102 before leaving the optical resonator or being lost, e.g. due to scattering or absorption of radiation. Besides, the guided radiation is laterally confined in both non-axial directions, due to the waveguiding effect. This lateral confinement may be on length scales corresponding to a sub-wavelength region for the radiation used for sensing (e.g. terahertz radiation, e.g. around 600-700 GHz). As the reflecting means 102 are typically conceived as high-reflectivity reflectors, e.g. having a reflectance greater than 90%, preferably exceeding 98%, guided radiation is effectively captured in a propagation region 103 of the optical resonator and decaying at a rate slow enough to ensure significant intensity built-up (e.g. by a factor of one hundred) inside the optical resonator if an optical resonance condition is met. This resonance enhancement of a received radiation signal interacting with the sensed analyte provides a significant increase in sensitivity. A person skilled in the art will understand that the optical resonator of the waveguide structure 101 may extend beyond the propagation region 103 as indicated in FIG. 1, and may, under some circumstances, include portions of the reflecting means 102, for example, if the reflecting means 102 are provided as a distributed reflectors. The reflecting means 102 may be arranged at both end portions of the waveguide structure 101 to have a symmetrical configuration or an asymmetrical configuration, e.g. a first and second reflector having substantially equal reflectance values or a first and second reflector having different reflectance values.

The reflecting means 102 of the exemplary embodiment of FIG. 1 are provided as a one-dimensional photonic crystal structure formed within the waveguide structure 101. For instance, reflecting means 102 may be provided at either side of the waveguide structure 101 by patterning a plurality of defects (e.g. holes) 105 into the waveguide material, acting as a set of distributed mirrors. In the present embodiment, the photonic crystal structure may be implemented as is a series of regularly spaced, cylindrical holes, patterned inside the waveguide material (e.g. high-resistivity silicon) and having their mid-points aligned along the axis of propagation of radiation confined inside the waveguide structure 101. For use with terahertz radiation, for example in the range of 600-700 GHz, a period of the photonic crystal structure implementing the reflecting means 102 may be preferably ranging from 80 micrometer to 200 micrometer for a 90 micrometer high, 210 micrometer wide high-resistivity silicon ridge waveguide and a series of defects (e.g. holes) may comprise eleven cylindrical holes having a radius between 5 micrometer and 60 micrometer, more preferably between 5 micrometer and 40 micrometer.

Although high-resistivity silicon as waveguide material is the preferred choice in some embodiments of the invention, in particular in those relating to received terahertz radiation signals, other embodiments of the invention are not limited to such waveguide material. For instance, waveguide materials that are suitable for the terahertz region may include sapphire or polymer waveguides such as polymethyl methacrylate (PMMA), polycarbonate (PC), polytetrafluoroethylene (PTFE), polyethylene (PE) or high-density polyethylene (HDPE), cyclic olefin copolymer (COC), etc. At different wavelengths, e.g. in the near-infrared or the visible region of the electromagnetic spectrum, yet other waveguide materials may be used, including, but not limited to silicon, germanium, silicon nitride, polymers, etc.

Figure 2:
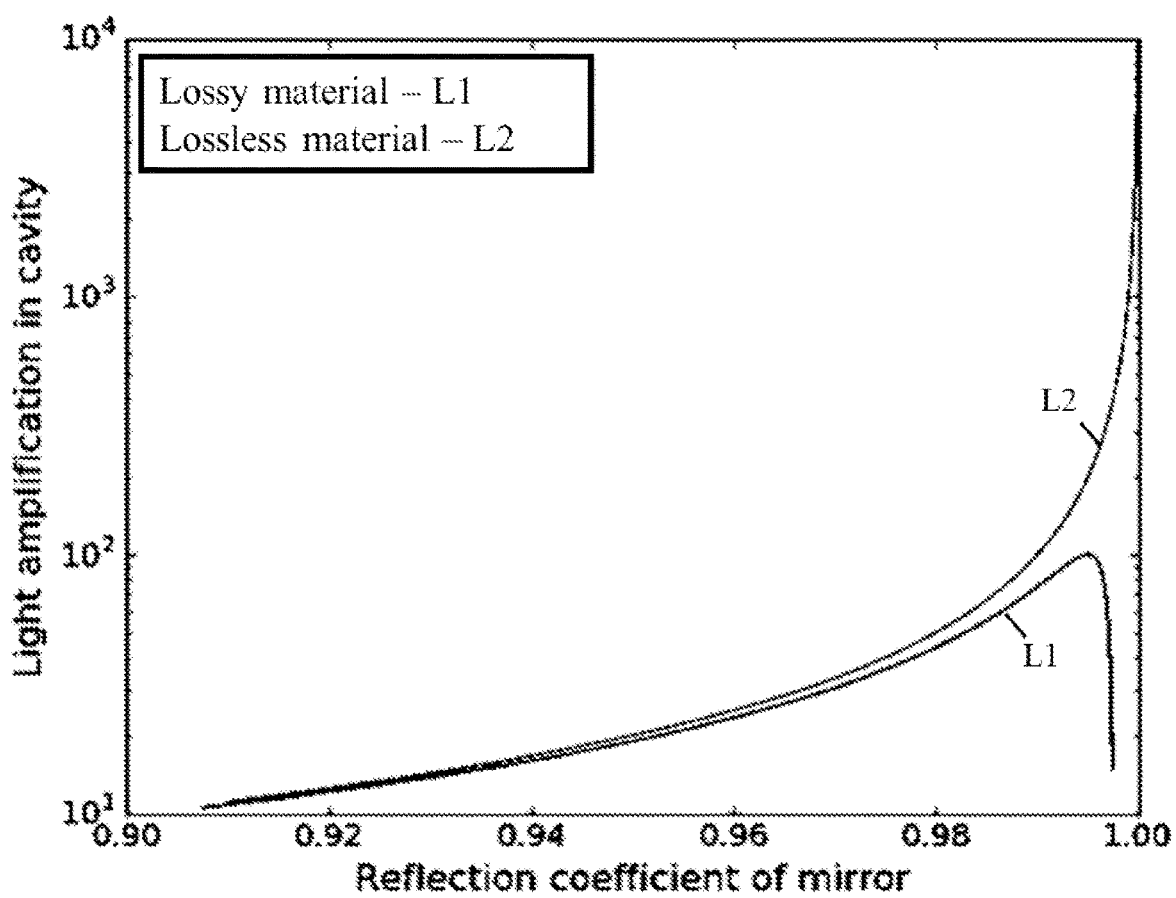
FIG. 2 is a diagram showing the functional relationship between optical enhancement of the optical resonator and reflectance of the reflecting means.

FIG. 2 demonstrates how the reflectance of the reflecting means 102 may be varied for an optical resonator which includes losses, in such a way that the resulting optical enhancement for a radiation signal satisfying a resonance condition is optimized. These losses can include the absorption losses relative to light-matter interaction with the sensed analyte in the fluid or relative to the waveguide material, or radiation losses caused by the reflector geometry, e.g. more radiation being scattered in geometries for which the reflector is distributed and higher reflectance being the result of adding more periods of partially reflective elements to the distributed reflector. Although being close to being a perfect mirror having 100% reflectance, the optimal enhancement of an radiation signal at optical resonance is achieved for reflectance values that are slightly decreased in respect of a perfect mirror as soon as absorption losses occur in the optical resonator. Reflecting means 102 may be engineered to have such optimal reflectance, e.g. by adjusting the number of defects (e.g. holes) in the photonic crystal structure. In consequence, large quality factors for the optical resonator on the order of $10^4$-$10^5$ may be obtained, leading to a tenfold or even hundredfold intensity enhancement of a resonant radiation signal used for sensing the analyte.

Figure 3:
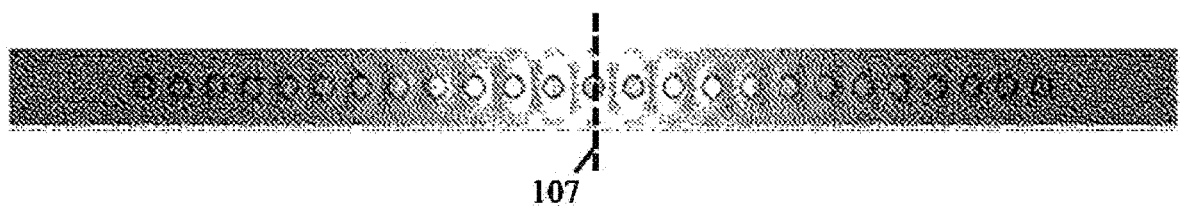
FIG. 3 illustrates an intensity distribution of an optically enhanced radiation field in the optical resonator.

For the present embodiment relating to FIG. 1, the propagation region 103 of the optical resonator may itself comprise a photonic crystal structure, e.g. a one-dimensional photonic crystal structure with cavity defects 104 (e.g. circular holes) supporting an air band Bloch mode. Typically, the Bloch modes supported by the photonic crystal structure of the optical resonator 103 are almost entirely rejected (e.g. reflected) by the photonic crystal structures provided by a reflecting means 102 on either side of the propagation region 103 of the optical resonator. If the propagation region 103 includes a photonic crystal structure which is symmetrical about a center cavity 1041, a symmetrical arrangement for the two reflecting means 102 on either side of the waveguide structure 101 will lead to the formation of enhanced standing waves of radiation inside the propagation region 103 which are also symmetrical. Therefore, the optically enhanced radiation field extending into the center cavity 1041, e.g. an air hole, is largest at its center position and is also symmetrical about its center line 107, as illustrated in FIG. 3. This is of advantage when an acoustic cavity mode is excited with the same center cavity 1041 being used as an acoustic cavity since both an excited acoustic cavity mode and the optical resonator mode are centered with respect to each other and share the same symmetry. A good mode overlap of this kind yields an improved energy transfer from the resonant optical mode to the excited acoustic cavity mode.

Figure 4:
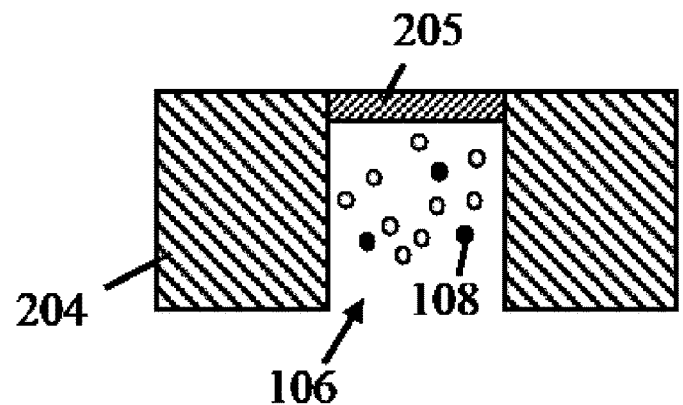
FIG. 4 illustrates an acoustic cavity formed in a waveguide structure in accordance with embodiments of the invention.

FIG. 4 is a cross-sectional view of a cavity 106, e.g. an air hole filled with fluid comprising the analyte 108 to be sensed, formed within the waveguide structure 101. Such a cavity 106 may be used as an acoustic cavity for accumulating the energy of generated pressure waves, whereby a light-induced acoustic signal is further enhanced. Although the center cavity 1041 is preferably used as acoustic cavity 106 in view of the maximally enhanced radiation signal there, the skilled person will acknowledge that also other cavities 104, e.g. air holes, of the propagation region 103 may, alternatively or additionally, serve as acoustic cavities. In this respect, it can be observed in FIG. 3 that also the two neighboring cavities adjacent to the center cavity 1041 contain a portion of the resonant radiation field which is significantly enhanced. Referring to FIG. 4, the cavity 106 used as an acoustic cavity is formed in the waveguide structure 101 such that lateral side walls comprising a waveguide material 204 (e.g. high-resistivity silicon) delimit the cavity 106. A frontal boundary of the cavity 106 is provided by a deformable thin-walled lid 205, e.g. a thin film, covering one of the cavity's end surfaces. Preferably, the cavity 106 is first provided as a cylindrical hole with circular openings in the waveguide material 204 before one of its circular openings is covered with the deformable thin-walled lid 205. A half-open cavity 106 is therefore configured to receive a fluid for sensing, comprising a sensed analyte 108, in a delimited sensing volume. A smaller sensing volume, according to the expression given in Eq. 1, is favorable for a more sensitive photoacoustic transducer.

For instance, the sensed species may be gaseous methanol in air (e.g. at atmospheric pressure, rarefied, or compressed) at a given concentration, which may be as low as a few ppm or even lower, e.g. as low as ppb or lower, e.g. on the order of ten to hundred ppt. An absorption line of methanol in the terahertz region used for detection may be the molecular transition at 636 GHz. As the resonant radiation field penetrates into the cavity 106, the received fluid comprising the analyte will absorb a fraction thereof and experience heating (e.g. a local increase in temperature). The sudden rise in local temperature generates a pressure wave which primarily propagates along a longitudinal direction of the cylindrical axis of the half-open cavity 106. It is noted that the cavity 106 typically has lateral dimensions which are smaller than its longitudinal dimension such that it amenable to an acoustic resonator of the half-open pipe type. For this type of acoustic resonator, the acoustic resonance frequency spectrum may be obtained from the relation $f_n = n*c_s/(4*L_{eff})$, where n is an odd integer indicating the resonance order, $c_s$ is the speed of sound and $L_{eff}$ is the effective resonator length expressed as $L_{eff} = L + 1.23*R$. Here, L and R are the acoustic resonator length and radius, respectively. For instance, the resonator length L is corresponding to a height of the cavity 106, being a thickness of the waveguide material 204 in which a circular hole is formed, and the resonator radius R is corresponding to a radius of the circular hole. An exemplary half-open cavity 106 having received air as fluid for sensing (speed of sound approximately equal to 344 m/s) and being of cylindrical shape with length 90 micrometer and radius 30 micrometer thus yields a first order (fundamental) acoustic resonance at approximately 793 kHz. A skilled artisan will know that a more accurate value of the acoustic resonance frequencies may be determined if further corrections are accounted for in a more accurate model, e.g. accounting for the corrections or shifts to the acoustic cavity's impedance when the acoustic cavity as one type of resonator is coupled to the vibrating membrane as a second type of resonator. This more accurate acoustic resonance frequencies $f_n$ may be obtained by means of a finite-element method.

Figure 5:
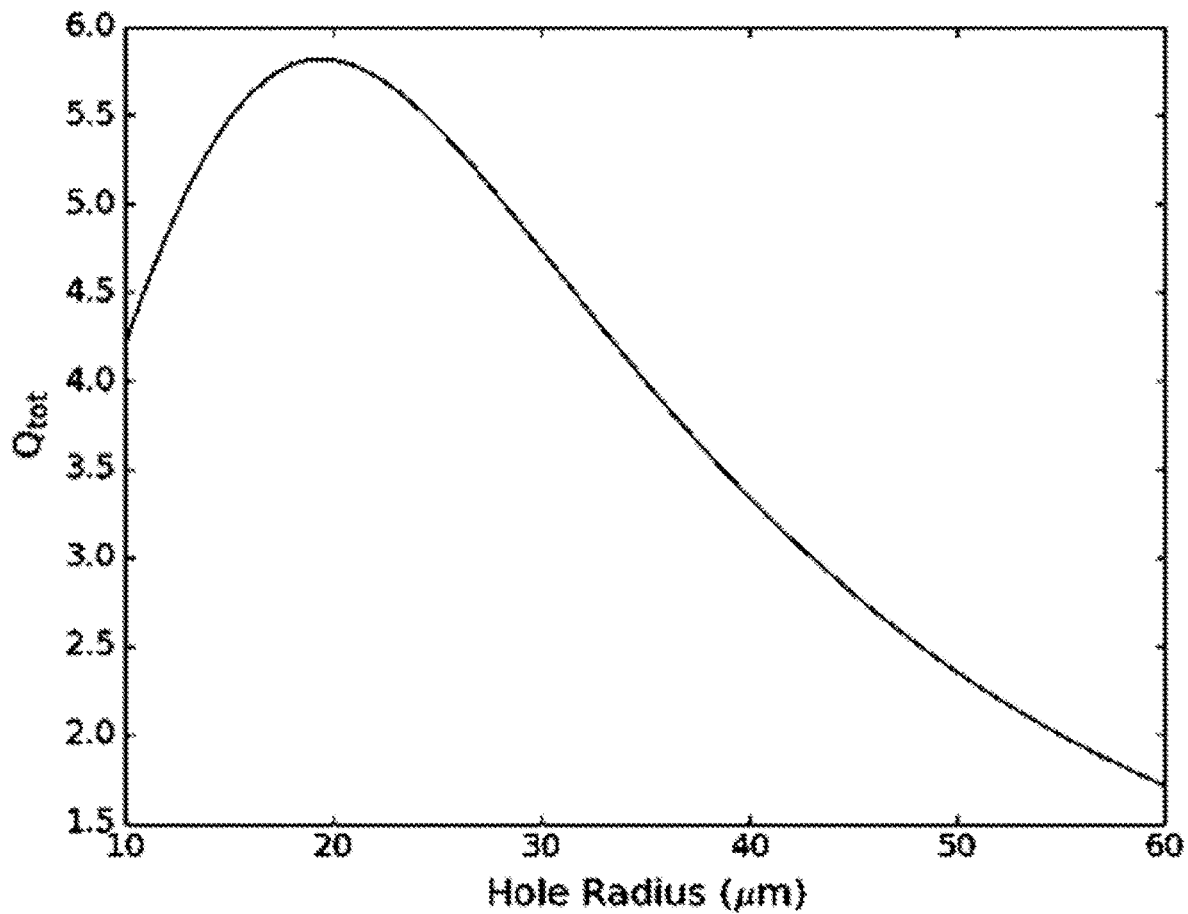
FIG. 5 is a diagram showing the functional relationship between the total quality factor Q_tot of a half-open cylindrical acoustic cavity and a corresponding hole radius R of the circular opening of the acoustic cavity.

FIG. 5 shows diagrams which further determine how the total quality factor (Q_tot) of an acoustic cavity being implemented as a hole defect in a photonic crystal structure depends on the radius of the hole defect. Two antagonistic loss mechanisms, viscous losses on the one hand and radiation losses at the open end of the acoustic resonator cavity on the other hand, determine the hole radius at which an optimal acoustic quality factor is obtained. In practical embodiments, the hole size may deviate from the optimal value, but acoustic resonances will, depending on the material platform, still yield reasonable quality factors, e.g. total quality factors (Q_tot) in the range two to six for a waveguide structure implemented in high-resistivity silicon and hole radii up to 50 micrometer.

From above example, it is understood that a periodic modulation of the radiation field heating the received fluid for sensing, if modulated at a modulation frequency overlapping with an acoustic resonance linewidth associated with the fundamental or any higher-order acoustic resonance frequency, creates a resonant or nearly resonant periodic driving force for the generated pressure waves inside the half-open cavity 106. Combined with the optically enhanced radiation field in the optical resonator, this yields a double enhancement for the detection signal relative to a sensed species. A modulation frequency of the radiation field may be achieved by way of intensity modulation, wavelength modulation or a combination thereof. In case of wavelength modulation of the radiation field, the optical resonance linewidth associated with the optical resonator is periodically swept and the resulting detuning for the optical resonator cavity leads to a periodic modulation of the intra-cavity optical intensity. Wavelength modulation is known to have the further advantage of generating overtones, e.g. multiple harmonics, of the modulation frequency used for modulating the wavelength of the radiation field applied to the photoacoustic transducer. This is a consequence of the nonlinear lineshape function being time-modulated. It may be used advantageously when working at a higher harmonic enables rejection of low-frequency noise (e.g. electronic noise, noise in the radiation source, mechanical noise) or when generating resonant acoustic waves in the acoustic cavity with acoustic resonance frequencies exceeding the available modulation frequency for modulating the wavelength of the applied radiation field (e.g. for a mechanical chopper wheel having a limited rotation speed). Intensity and/or wavelength modulation may be achieved via direct current modulation of an external radiation source coupled to the photoacoustic transducer or via external modulation means (electro-optical intensity or phase modulators, acousto-optical modulators, etc.) arranged upfront. Other intensity modulation means may include mechanical choppers, saturable absorbers which are additionally arranged in a radiation path of the optical resonator cavity, etc.

A threefold resonant structure providing a threefold enhancement for the detection signal relative to a sensed species is obtained by the deformable thin-walled lid 205, e.g. a suspended thin layer, referred to in FIG. 4, acting as a vibrating membrane under the pressure waves impinging thereon. An acoustic transducer as given by the thin-walled lid 205 is behaving as a mechanical oscillator that is extracting available acoustic energy, which has been deposited into an excited acoustic resonant mode and is reverberating in the acoustic cavity, e.g. inside the half-open cavity 106, and is converting it into mechanical energy associated with elastic deformations of the thin-walled lid 205. These deformations of the photoacoustic transducer are readily available for read-out by a suitable readout system, e.g. a readout system comprising an optical displacement sensor or a suitable optical interrogation means, such as a laser Doppler vibrometer arrangement, interferometric position determination arrangements, etc. At a structural resonance frequency of the acoustic transducer; e.g. at an eigenfrequency for the vibrating lid 205, a deformation amplitude of the lid 205 will be strongly enhanced, which improves the detectability of the deflections at the lid surface during readout and also boosts the overall sensitivity of the photoacoustic transducer. Therefore, the thin-walled lid 205 is conceived in such a way that at least one of its structural resonances (e.g. mechanical resonance linewidths) is overlapping with an acoustic resonance frequency of the acoustic resonator cavity (e.g. the half-open cavity 106), or a multiple thereof, if the photonic transducer is in an operating condition. Under this condition, the pressure waves generated at an acoustic resonance frequency inside the acoustic cavity will efficiently drive the acoustic transduce.

According to preferred embodiments of the present invention, a deformable thin-walled lid 205 may be provided as a thin patch of a silicon nitride (SiN) or aluminum nitride (AlN) layer, e.g. a portion of SiN layer or AlN having a thickness value below or equal to one micrometer, e.g. a thickness value of 100 nm+/−10 nm. The thickness of the lid 205 may be controlled to achieve the overlap between a structural resonance and an acoustic resonance frequency of the acoustic cavity, e.g. by controlling a deposition rate, temperature and/or deposition time of SiN on a silicon substrate during a low-pressure chemical vapor deposition (LPCVD) process. Additionally, or alternatively, the residual tensile stress of deposited SiN using LPCVD may be adjusted to a value which leads to a spectral overlap between the mechanical structural resonances of the vibrating lid 205 and the acoustic resonances of the half-open cavity 106. For instance, the residual tensile stress or a portion of a deposited SiN layer using LPCVD may be adjusted to a value below or equal to 200 MPa, e.g. to a value in the range from 50 MPa to 200 MPa. A thin layer of AlN may be deposited by sputtering. Portions of deposited thin layers may be defined lithographically and may be achieved in a subsequent etching step. A finite-element solver may be used to simulate and/or locate mechanical structural resonance frequencies of the thin-walled lid 205 (e.g. diaphragm), including the associated losses resulting from energy dissipation at the anchors, thermoelastic damping (internal friction), and viscosity losses due to the dragging of air at the lid-air interface.

A thin deformable SiN or AlN layer is preferably used in embodiments of the present invention for providing the acoustic transducer since it combines low optical absorption properties and good integration behavior with available CMOS and MEMS fabrication technologies, e.g. with integrated silicon photonics providing high-resistivity silicon substrates for terahertz waveguiding. Furthermore, a thin layer of deposited SiN or AlN may also function as an etch stop material during a backside etching process removing a silicon oxide cladding layer. However embodiments of the present invention are not limited to the use of SiN or AlN as materials for the deformable lid 205.

A thin deformable layer in the deformable lid or diaphragm may comprise additional protection layers, which may be useful in the process of backside etching (for forming the at least one acoustic cavity) during which the deformable lid or diaphragm may be damaged without such protection.

FIG. 3 shows the intensity distribution of an optical mode under an optical resonance condition for an exemplary optical resonator. This optical resonator is integrally formed within a partially suspended high-resistivity silicon waveguide structure by providing two distributed reflectors on either side of the optical resonator, wherein each distributed reflector is provided as a photonic crystal structure comprising a series of eleven consecutive holes with circular openings having a radius of 29 micrometer for radiation signals received at 0.636 THz. A defect period for the photonic crystal reflectors is gradually changed from 106.5 micrometer to 120.6 micrometer, following a parabolic scaling function. The proposed optical resonator comprises three hole defects in the propagation region at its center, one or all three of which are used as acoustic cavities in which pressure waves are generated and resonantly accumulated if the sensed species is present. A quality factor associated with the optical mode referred to in FIG. 3 may be on the order of $5.7 \cdot 10^4$, while the obtained optical modal volume evaluated around the center hole may be as small as $V=0.685$ $(\lambda/n_{max})^3$. Here, $\lambda$ is the wavelength of the applied radiation field at the optical resonance frequency (e.g. $\lambda=471.4$ micrometer for a sensed absorption line of methanol) and $n_{max}$ the highest refractive index of the waveguide structure material (e.g. high-resistivity silicon). A typical value for $n_{max}$, which has also been used for FIG. 3, may be $n_{max}=3.42$ for radiation signals received at 0.636 THz. Propagation losses for this waveguide structure may be as low as 0.04 dB/cm if high-resistivity silicon is used as waveguide material. It is an advantage of high-resistivity silicon to be sufficiently transparent to terahertz radiation propagating therein and provide a high refractive index (e.g. $n_{HRSi}>3$) for good optical confinement at the same time.

Figure 6:
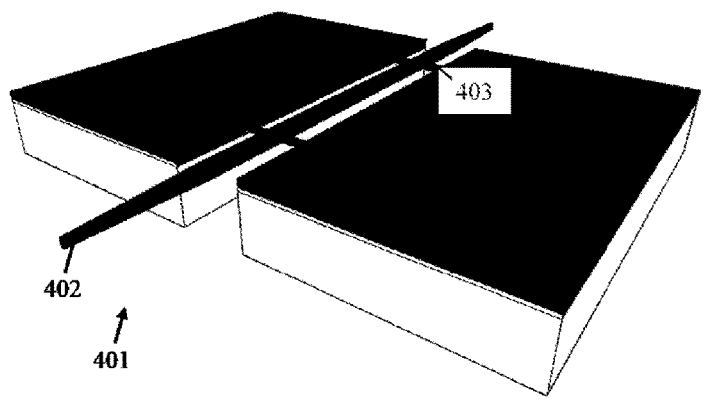
FIG. 6 shows an integrated photoacoustic transducer for assisting in sensing a species in a fluid, according to one embodiment of the present invention, which uses a partially suspended waveguide structure.

FIG. 6 is a perspective view of a partially suspended waveguide structure 401 in a photoacoustic transducer according to an embodiment of the present invention. A bottom substrate has been removed for the so suspended waveguide structure 401, leaving a channel region filled with air or vacuum, which provide a bottom cladding for the waveguide structure 401, which may be patterned into a 90 micrometer thick high-resistivity silicon layer provided on a standard silicon wafer comprising a buried oxide layer. Having a thick silicon layer and the buried oxide layer removed in the suspended region, further reduces propagation losses of terahertz radiation related to absorption in the buried oxide layer, if not removed, and further increases the available refractive index contrast for waveguiding application yielding improved confinement. This is particularly relevant for enhancing the resonant radiation field inside the optical resonator being formed in this waveguide structure 401. However, considering different wavelength region for photoacoustic sensing applications, the given dimensions of the partially suspended waveguide structure 401 may be adapted accordingly. A plurality of tethers 403 are attaching the partially suspended waveguide structure 401 to the bulk of the substrate, thereby holding the partially suspended waveguide structure 401 firmly in place. Inverted tapers 402 may be provided on both ends of the partially suspended waveguide structure 401 to couple in (e.g. receiving) and/or couple out of the waveguide structure 401 the radiation field applied for sensing.

Figure 7:
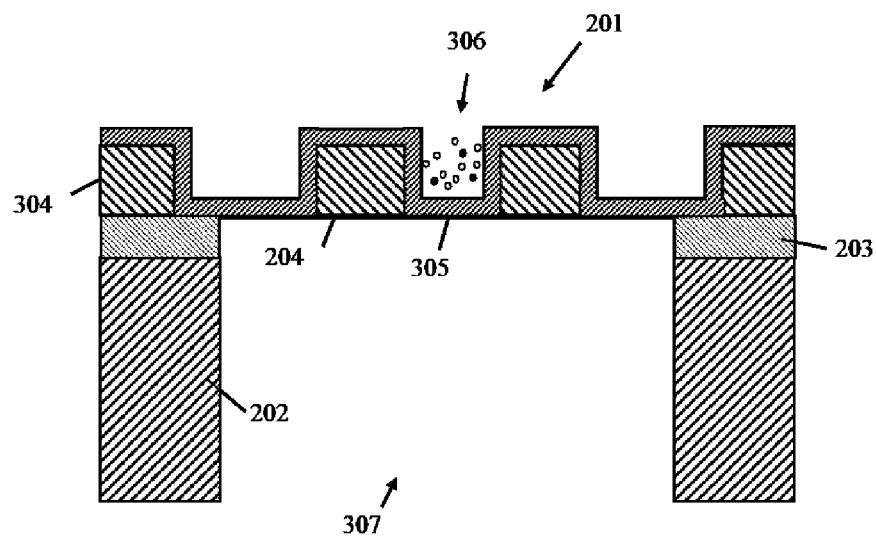
FIG. 7 and FIG. 8 are showing a schematic cross-sectional view and a related sequence of processing steps of an integrated photoacoustic transducer comprising a partially suspended waveguide structure in accordance with embodiments of the present invention.
Figure 8:
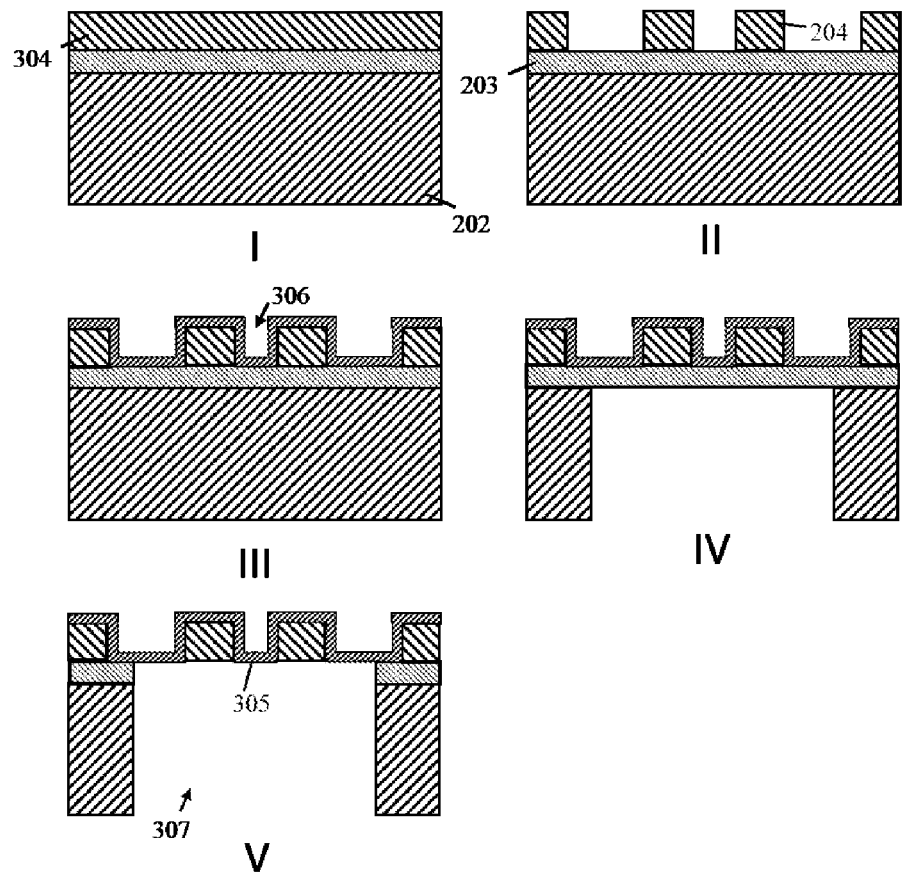

FIG. 7 is showing a cross-section of a photoacoustic transducer (perpendicular to a propagation axis of the waveguide structure) comprising a partially suspended waveguide structure 201, and FIG. 8, related thereto, a sequence of processing steps. The partially suspended waveguide structure 201 has formed therein a half-open acoustic cavity 306 which is configured for receiving a fluid for sensing, e.g. a fluid for sensing may be poured into the half-open acoustic cavity 306 from the top or the half-open acoustic cavity 306 may be communicating with an ambient fluid through its opening at the top. Lateral sidewall comprising waveguide material 204 (e.g. high-resistivity silicon) are delimiting the half-open acoustic cavity 306 in a radial direction, whereas a deformable thin-walled lid 305 (e.g. a thin portion of a conformal SiN layer) is arranged at a base of the half-open acoustic cavity 306 providing a boundary at its bottom. The half-open acoustic cavity 306 may correspond to a center hole of a photonic crystal structure formed within the partially suspended waveguide structure 201. A hollow trench region 307 is provided below the suspended waveguide material 204 and the half-open acoustic cavity 306. Therefore, deflections of a vibrating thin-walled lid 305 may be detected also from a bottom side and through the trench region 307 of the photoacoustic transducer when operated. The hollow trench region 307 has lateral sidewalls comprising a bulk substrate material 202, e.g. a silicon substrate of a wafer, and a buried layer material 203, e.g. a buried silicon oxide. The waveguide structure 201 is laterally separated from the top layer 304 (e.g. high-resistivity silicon layer) as a result of lithographic patterning. Although there may be some residual deposited material present which laterally connects the waveguide structure 201 to the adjacent top layer 304, e.g. the deposited thin layer of conformally applied SiN used to create the thin-walled lid 305, this residual material is generally too thin and the lateral spacing between the waveguide structure 201 and the top layer 304 too wide to obtain evanescent tail or coupling or substrate leakage. Therefore, the waveguide structure 201 is also optically isolated from the adjacent top layer 304 and a received radiation signal remains well-confined to the waveguide structure 201.

Referring to FIG. 8, a substrate (e.g. a silicon wafer) is provided in a first step I. The substrate comprises a material layer stack including a thick bottom layer material 202, e.g. a 700 micrometer silicon layer, an intermediate buried layer material 203, e.g. 2 micrometer thick buried silicon oxide layer, and a top layer material 304, e.g. a 90 micrometer thick high-resistivity silicon layer. In a second processing step II, the waveguide structure 201 is lithographically defined and patterned into the top layer 304, using a DRIE etching process for instance with the buried layer material 203 acting as etch stop material. This yields for example the ridge waveguide comprising waveguide material 204. The second processing step II may also be the step during which the one or more acoustic cavities are formed and/or the photonic crystal structures are patterned. A thin layer is deposited on top of the patterned top layer 304 during a third processing step III, e.g. a thin silicon nitride layer (e.g. 100 to 1000 nanometer thick). This may be achieved in an LPCVD process, which allows for a good control of the residual tensile stress (e.g. lower than 200 MPa) in the deposited thin layer. In a fourth processing step IV, the bottom layer material 202 is selectively removed from the backside of the material layer stack, e.g. by using DRIE etching and the buried layer material 203 as etch stop material. The selective removal is defining a hollow trench area 307 over which the waveguide structure 201 will be partially suspended. The partially exposed buried layer material in the hollow trench region 307 is removed in a fifth processing step V, e.g. by performing an HF etch at the backside for which the thin deposited layer material is acting as an etch stop material. Having completed the fifth processing step V, the thin deposited layer is partially exposed at the backside and the front side of the processed substrate. Therefore, the thin deposited layer will not be constrained in a vertical direction when vibrating at the bottom of the half-open acoustic cavity 306, i.e. a deformable lid 305 is obtained at one of the bases of the half-open acoustic cavity 306. The deformable lid 305 remains constrained in a lateral direction, however, where it is attached to the waveguide material 204 by molecular binding forces.

Figure 9:
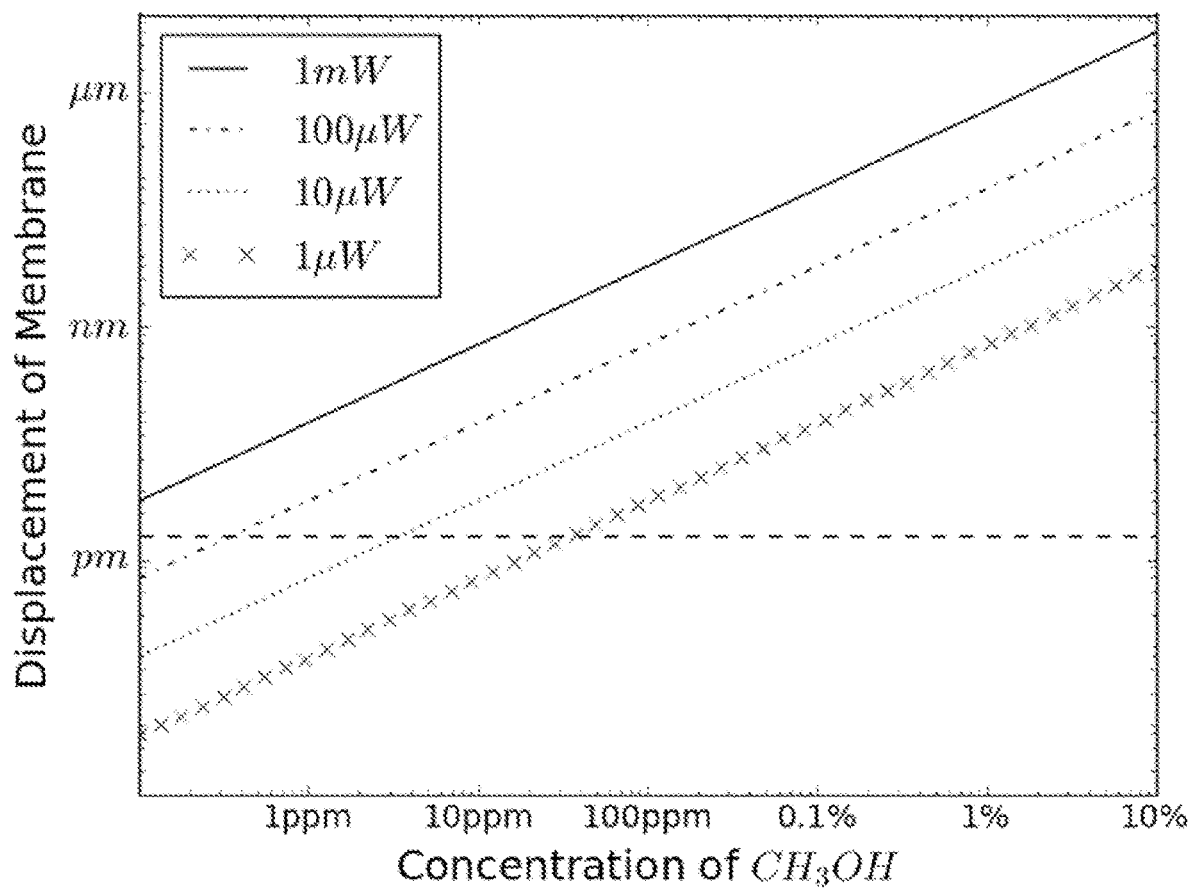
FIG. 9 is a graph showing the functional relationship between a sensed concentration of methanol as sensed species in air and a mechanical displacement of the acoustic transducer for various optical powers of the applied radiation field.

Referring to FIG. 9, simulation results are shown for the mechanical displacements of the acoustic transducer depending on different concentration of a sensed methanol species in air, using the optical transition in the terahertz band at 636 GHz. For this simulation, a circular membrane-like lid of 100 nm thick silicon nitride was used as acoustic transducer positioned above the circular opening of a photonic crystal defect. On a log-log scale, the displacement of the acoustic transducer is linearly dependent on the sensed methanol concentration, which ranges from a few ppm to tens of vol. percent. This also holds for various powers of the radiation field applied to the photoacoustic transducer, e.g. optical powers or THz powers ranging between one microwatt and one milliwatt. As can be seen in FIG. 9, the mechanical displacement is on the order of a few picometer up to a few micrometer at most, depending on the sensed concentration of methanol, and hence, is neglectable compared to the height/length of the acoustic cavity (e.g. for a 90 micrometer high defect). The horizontal, dashed line indicates a detection limit of commercially available laser doppler vibrometers (LDV) which may be used as optical displacement sensors in a readout system. In consequence, an optical power may be increased when sensing at very low concentrations of the species to overcome this current limit of detection for LDV systems. It is emphasized that LDV systems provide only one way of detecting a deformation signal of the at least one acoustic transducer during readout, e.g. by optically detecting a displacement of the membrane. The present invention is not limited to the use and provision of such optical displacement detecting system and the skilled artisan will recognize that other systems suitable for a readout may be provided alternatively or additionally, such as, for instance, piezoelectric or piezoresistive sensing elements coupled to the at least one acoustic transducer, e.g. coupled or integrated into a membrane/diaphragm to sense a flexion thereof based on a change in a measured piezoelectric or piezoresistive sensor signal.

The linear relationship between the concentration of the sensed species and the displacement of the acoustic transducer simplifies the calibration of the photoacoustic transducer or a suitable readout system used in combination therewith. At intermediate concentrations, a very limited amount of applied optical power on the order a few microwatt is sufficient for reliable detection of the related displacement signal of the photoacoustic transducer, even at room-temperature. This is a substantial advantage when dealing with terahertz sources, which often have strict limits for the achievable optical power outputs or do require complex, typically cryogenically operated setups at higher optical power outputs, which makes them less suited for cheap and portable sensing applications.

In a second aspect, the invention relates to photoacoustic sensing system for sensing a species in a fluid. The photoacoustic sensing system comprises at least one photoacoustic transducer according to any of the embodiments of the first aspect of the present invention, a radiation source optically coupled to the waveguide structure, modulation means for modulating a radiation signal delivered by the radiation source, and readout means for detecting a structural deformation of the acoustic transducer.

According to preferred embodiments, the photoacoustic sensing system is sensing optical absorption features (e.g. absorption lines or bands) of the species in the terahertz region. Therefore, a suitable radiation source is a terahertz source of radiation. A terahertz radiation signal, by way of example, may be generated by the terahertz source of radiation and is then coupled into the waveguide structure, e.g. via a hollow terahertz waveguide into which a tapered end portion of a partially suspended waveguide structure of the integrated photoacoustic transducer is at least partially introduced. As the photoacoustic transducer accepts also very low optical power levels, e.g. below one milliwatt, while still working accurately, low-power radiation sources operable at room temperature may be used. This avoids cryogenic cooling of powerful QCL sources and also opens the field of photoacoustic absorption spectroscopy in the terahertz region to photomixing sources having limited output power. Other radiation sources for the terahertz region may include sources using optical rectification or gas lasers emitting at transitions in the terahertz region. In the visible and infrared region, many solid-state laser sources (e.g. semiconductor laser diodes, VCSELs, etc.) are available. Prior to coupling, the radiation delivered by the radiation source is modulated by suitable modulation means such as direct current modulation of the radiation source itself, a mechanical shutter or chopper wheel, or, depending on the wavelength used for sensing, electro-optical or acousto-optical modulators. For some embodiments, the photonic integrated photoacoustic transducer itself or a larger photonic integrated circuit the photoacoustic transducer is part, may also include integrated modulation means for the radiation delivered by the radiation source.

Readout means for detecting a structural deformation of the acoustic transducer, e.g. displacements of a vibrating lid/diaphragm, may comprise a suitable optical displacement sensor, such as the previously mentioned laser Doppler vibrometer system. An optical displacement sensor may also be provided as an interferometric sensor in which a displaceable surface of the acoustic transducer is arranged as one at least partially reflective side of an external optical cavity, the other side being a reflective surface at a fixed position, e.g. a reflective fiber facet. An optical path length associated with such external cavity is changed if the displaceable surface of the acoustic transducer is approaching or moving away from the other reflective surface. This results in a measurable change in the external optical cavity's reflection curve. An interferometric sensor in which the displaceable surface of the acoustic transducer is arranged as a partially reflective surface may also be a Michelson-type interferometer. Alternatively, for embodiments of the photoacoustic transducer that are providing an acoustic transducer including piezo-resistive (e.g. silicon, aluminum nitride) or piezo-electric material (e.g. silicon oxide, aluminum nitride), a suitable readout means may comprise a current or voltage sensing circuit connected to probe electrodes associated with the displaceable surface of the acoustic transducer. Readout means for detecting a mechanical deformation are not limited to the readout of a mechanical displacement of the deformable portion of the acoustic transducer. One may also conceive readout means for detecting a mechanical deformation in the form of internal stress being built up on the deformable portion of the acoustic transducer, e.g. a stress-sensing gauge or stress-induced birefringence measured by polarimetry.

In a third aspect, the present invention relates to a photoacoustic absorption spectroscopy method for sensing concentrations of a species in a fluid. According to this method, a radiation signal modulated at a modulation frequency (e.g. modulated radiation signal at a modulation frequency larger or equal to 10 kHz, larger or equal to 50 kHz, larger or equal to 100 kHz, larger or equal to 500 kHz, or even larger or equal to 1 MHz) is generated and coupled into the waveguide structure of any of the integrated photonics photoacoustic transducers relating to the first aspect. The fluid for sensing comprising the species of interest at an unknown concentration (including the case of the species being absent) is then brought in fluid communication with the at least one acoustic cavity of the integrated photoacoustic transducer, e.g. via pouring or pumping the fluid into the at least one acoustic cavity, by letting the fluid diffuse into the at least one acoustic cavity, or by placing the integrated photoacoustic transducer in a sensing cell comprising the fluid, etc. The modulation of the radiation signal may include modulating an intensity level of the radiation signal, modulating a wavelength of the radiation signal, or a combination thereof. A center wavelength of the coupled radiation signal is selected in such a way that it is overlapping with a known spectral absorption feature (e.g. an optical transition linewidth) of the species for which a concentration is sensed. Depending on the pressure inside the fluid, a width of the known spectral absorption feature (e.g. FWHM width of an absorption line) may be smaller or greater than a natural linewidth associated with the unmodulated radiation signal. The latter is usually the case, except for gases at ultra-low pressures.

The modulated radiation signal causes a periodic heating of the fluid, mediated through the absorption of radiation by the species of interest, which takes place at the same frequency as the modulation frequency, or which, in case of wavelength modulation, may also take place at integer multiples, i.e. higher harmonics, of the modulation frequency. Periodic heating of the fluid directly translates into generating pressure waves which are reflected forth and back inside the at least one acoustic cavity, wherein the at least one acoustic transducer is configured to at least partially reflect pressure waves over a portion of the boundary of the at least one acoustic cavity when the pressure waves are incident thereon. In consequence, a deformable mechanical portion of the at least one acoustic transducer is set into an oscillatory motion (e.g. surface displacement of a vibrating surface) which takes place at the modulation frequency or a higher harmonic thereof. An amplitude associated with the periodic deformations of the at least one acoustic transducer is then detected, e.g. by a suitable readout means such as a laser Doppler vibrometer. In a last step, a concentration of the sensed species is derived from the detected amplitude associated with the periodic deformations, using for instance a calibration curve or look-up table. According to the method, the integrated photonic transducer, when operating, is generating amplitude signals associated with the periodic deformations of the at least one acoustic transducer which are characterized by a twofold or threefold enhancement, thereby increasing the available sensitivity range for this method. A first signal enhancement is achieved by selecting the properties of the optical resonator of the integrated photonics photoacoustic transducer in such a way that an optical resonance (e.g. a resonance linewidth of the optical resonator) is spectrally overlapping with the center wavelength of the modulated radiation signal. Generally, a width associated with the optical resonance (e.g. the width given by the FWHM of the resonance linewidth of the optical resonator) is broader than the natural linewidth associated with the radiation signal (e.g. with radiation emitted by a narrow-linewidth laser source). This ensures that a large portion of the energy conveyed by the radiation signal is coupled into the optical resonator under a resonance condition and participates in an optimal manner in building up (e.g. enhancing) an amplitude of the circulating radiation inside the optical resonator. Moreover, this also ensure that small excursion from the center wavelength during a wavelength modulation of the radiation signal do not lead to a complete loss of the optical resonance. A shorter optical resonator length, as provided by the resonator waveguide structure in an integrated photonic device for instance, is also of advantage, because the free spectral range, associated with such shorter optical resonators, tends to be larger than the free spectral range for a macroscopic (e.g. tens of centimeter long), non-integrated optical resonator having an equal finesse. A larger free spectral range is known to prevent resonator mode hopping and facilitates stable operation near or at a resonance condition for the optical resonator during sensing. In consequence, an actuated reflector (e.g. mirror) of the resonator, to which a controlled feedback for tracking of the resonance is applied, may be unnecessary. A second signal enhancement is achieved by selecting the properties of the at least one acoustic cavity of the integrated photonics photoacoustic transducer in such a way that an acoustic resonance (e.g. an acoustic resonance linewidth of the acoustic resonator cavity) is spectrally overlapping with the modulation frequency of the modulated radiation signal, or an integer multiple thereof. The acoustic resonances may be adjusted during a design stage by determining the geometry of the at least one acoustic cavity (e.g. height/length and radius), by changing an acoustic impedance associated with the at least one acoustic cavity (e.g. by choosing material and thickness of the deformable lid), etc. Eventually, a third signal enhancement can be achieved by selecting or adjusting the properties of the deformable mechanical portion of the at least one acoustic transducer of the integrated photonics photoacoustic transducer in such a way that an associated adjustable mechanical resonance (e.g. a mechanical resonance linewidth of the mechanical oscillator) is spectrally overlapping an acoustic resonance of the at least one acoustic cavity. This adjustment may be obtained by choosing material and thickness of the deformable lid or membrane, by adding extra perforations to the membrane, by removing small mass loadings arranged over a surface of the membrane, etc.

Figure 14:
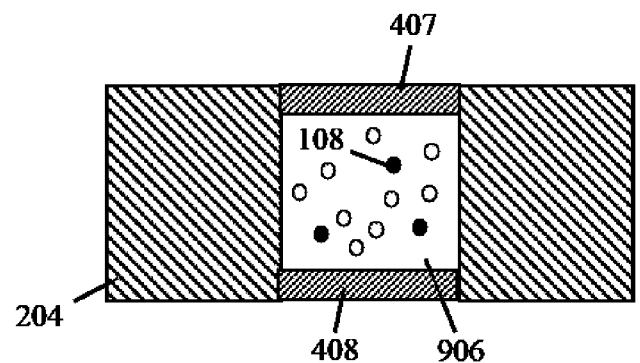
FIG. 14 is a cross-section of an acoustic cavity of an integrated photoacoustic transducer, which is closed at both ends, according to an embodiment of the present invention.

According to some embodiments of the invention, the at least one acoustic transducer of the integrated photoacoustic transducer includes two deformable membranes mechanically attached to one acoustic cavity at opposite end portions thereof. The two deformable membranes are arranged for being displaced along opposite directions under the impact of incident acoustic waves generated with that acoustic cavity. An example of such an embodiments is illustrated in FIG. 14. Typically, the acoustic cavity has a height which is smaller than the acoustic wavelength corresponding to the resonant acoustic signal generated therein. This has the advantage that these embodiments are capable of generating a differential readout signal, e.g. by subtracting the detected enhanced amplitudes of the respective membrane displacements. The differential signal will remove to a large extent any acoustic background signals which could impair the accuracy for the concentration sensing measurement.

In alternative embodiments, the two deformable membranes are provided by two different acoustic transducers of the integrated photoacoustic transducer and are each mechanically attached to an end portion of a different acoustic cavity, wherein the end portions for the two membranes are opposite to each other and the two acoustic cavities are spaced at a distance from each other that is inferior to an acoustic wavelength corresponding to an acoustic signal generated in either one of the two acoustic cavities. Preferably, the two acoustic cavities are matched as well as possible in respect of their individual acoustic resonances. The two deformable membranes are arranged for being displaced along opposite directions under the impact of incident acoustic waves generated with the two acoustic cavities. Both acoustic cavities are provided with the same volume of fluid for sensing comprising the species to be sensed at the same concentration. Again, this has the advantage that such alternative embodiments are capable of generating a differential readout signal, e.g. by subtracting the detected enhanced amplitudes of the respective membrane displacements. The differential signal will remove to a large extent any acoustic background signals which could impair the accuracy for the concentration sensing measurement.

According to some embodiments of the invention, the thin-walled lid/membrane may comprise one or more perforations, e.g. may be micro-perforated. This allows the fluid for sensing to be received also from the end of the at least one acoustic cavity which is supporting or covered by the thin-walled lid/membrane as deformable mechanical portion. The provision of micro-perforations has further advantages including, for instance, the engineering of the membranes resonance frequencies, the engineering of the overall acoustic impedance of the micro-perforated membrane and the sound absorption properties of the coupled system of acoustic cavity and micro-perforated membrane arranged at one of its end faces. For example, it can be shown that for perforated flexible membranes the acoustic impedance of the perforations, $z_{perf}$, is governed by the acoustic impedance ascribable to a single hole, $z_{hole}$, and the perforation ratio $\delta$ as $z_{perf} = z_{hole}/\delta$. Maa's model with end correction or an extension thereof may be used to determine the single hole acoustic impedance $z_{hole}$, e.g. accounting for the membrane's own motion which imposes a drag velocity to the fluid at the perforation boundaries. The overall acoustic impedance, $z_{tot}$, for the micro-perforated membrane may then be derived as $1/z_{tot} = 1/z_{perf} + 1/z_{vib}$, wherein $z_{vib}$ is the acoustic impedance ascribed to the vibration of the membrane. The result may also combined with the acoustic cavity (e.g. air cavity) backing the perforated vibrating membrane, e.g. as $z = z_{tot} - \cot(j\omega L_{cav}/c_{sound})$ with acoustic angular frequency $\omega$, acoustic cavity length $L_{cav}$ and speed of sound $c_{sound}$. It is pointed out that engineering of the acoustic impedance of the acoustic cavity and (perforated) membrane system may also have the advantage of allowing to filter out low-frequency acoustic background noise.

Figure 10:
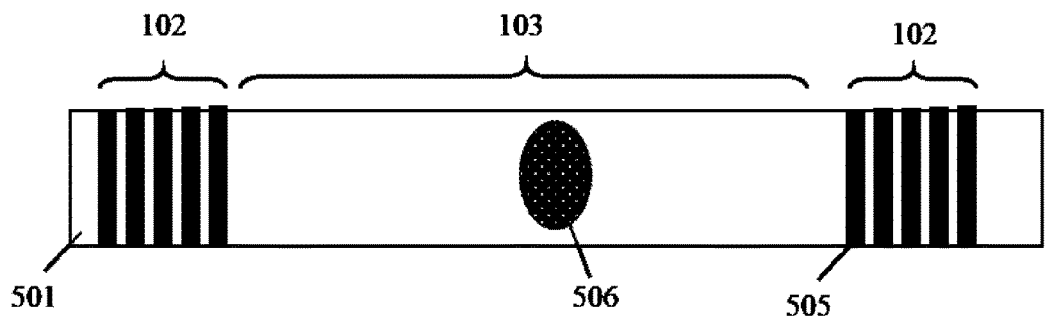
FIG. 10 is a schematic of an integrated photoacoustic transducer including an elliptical acoustic, according to an embodiment of the present invention.

Embodiments of the present invention have been described which are providing a photonic crystal structure. This has the advantageous effect that they support a banded mode structure for the radiation field admitted into the photonic crystal, one of the supported Bloch modes being an air band for which the energy transported by the propagating light/radiation as well as the energy associated with the resulting standing wave is predominantly confined to the defect sites, e.g. holes of the photonic crystal structure. This guarantees a good overlap of the built-up radiation with a fluid comprising the analyte/species to be sensed, thereby heating the fluid and generating pressure waves more efficiently. Moreover, a modal volume for the resonant radiation field confined to a single defect site (e.g. a single air hole) may be advantageously reduced, thereby providing an efficient light-matter interaction even in a very small-sized sensing volume (e.g. tens to hundreds of picolitre) for which the photoacoustic transducer achieves better sensitivity (see Eq. 1). It is a further advantage of such embodiments of the present invention that the fabrication of hole defects in photonic crystal structures is a well-controlled process, especially for the terahertz range in which critical photonic dimensions tend to be larger as compared with visible light applications. It is therefore possible to design reflecting means comprising photonic crystal structures such that radiation field admitted into the resulting optical resonator comprises a light signal at a transition wavelength of the sensed analyte and such that an anti-node corresponding to a standing, enhanced wave of that light signal is positioned at the center of at least one acoustic cavity. In consequence, a symmetrical excitation of an acoustic resonant mode in the at least one acoustic cavity is obtainable with good spatial mode overlap between the resonant optical mode and the excited resonant acoustic mode, whereby energy is transferred in a more efficient way. However, different embodiments may provide the overlap of the radiation field and the fluid for sensing without implementing a photonic crystal structure. An example thereof is given in FIG. 10 to FIG. 12 explained hereinunder.

Although regularly spaced, cylindrical holes are given as an example, different embodiments of the present invention may implement reflecting means using a photonic crystal structure of one or two dimensions, which is based on other shapes such as diamond-shaped holes, square holes, rectangular holes, non-cylindrical defects, e.g. inverted pyramidal or cone-shaped cavity defects patterned into the resonator waveguide material, frustums of inverted pyramids or cones, etc. The holes or defects may also be filled by a material which is different from that of the surrounding resonator waveguide material. Alternatively, a shaped material, e.g. a series of pyramids or pillars, may be deposited on top of a flat waveguide structure, thereby obtaining a recurrent local perturbation of the corresponding effective refractive index of the waveguide structure that produces the mirroring action.

The reflecting means may also be may be provided as Bragg grating structure, e.g. by periodically doping of a waveguide structure, periodically modulating its height profile, etc. Alternatively, reflecting means may include coated or uncoated end facets acting as partially or highly reflecting mirrors, a reflectance value depending on the quality of the facet interface, possible coatings (e.g. metal coating), a refractive index contrast with the surrounding medium.

The holes, cavity defects or elements of the Bragg grating structure used to implement reflecting means do not have to be arranged in a strictly periodical manner. A skilled person appreciates the fact that such periodical arrangements may be extended to arrangements including a chirped or a modulated spatial period. This is of benefit if a transmission band and/or a rejection band of the reflecting means is engineered such that the reflecting means achieve a god mirror performance over a wider wavelength range for instance. Likewise, a tapered reflecting means for further reducing insertion and/or leakage losses may be achieved by deviating from a strictly periodic arrangement, e.g. by increasing/decreasing a spatial period (e.g. hole-to-hole spacing) or a defect size (e.g. hole diameters) in a linear, quadratic, or any other functional manner along the direction of propagation for the waveguide structure.

Yet another way of generating a standing wave in a waveguide structure is to provide a ring resonator by connecting both ends of a waveguide. Both clockwise and counter-clockwise propagating beams may be coupled to the ring resonator, which produces the standing wave pattern.

In particular embodiments of the invention, the deformable, e.g. displaceable, mechanical portion of the acoustic transducer may be perforated, e.g. a perforated membrane. This perforation may comprise one or more holes that extend through this mechanical portion, for instance one or more holes/punctures that extend through the thin wall of the lid or membrane. These perforations may be of small lateral dimensions, e.g. lateral dimensions that are within the sub-wavelength region of the acoustical signal emanating from the at least one acoustic cavity. This ensures that there is no negative impact on the reflecting quality of the mechanical portion, e.g. the membrane, with respect to the impeding acoustic signals. Sub-wavelength perforations will not scatter or diffract incident acoustic signals in a noticeable fashion. The perforations are useful in two ways. First, they yield a permeable mechanical portion, e.g. a permeable membrane, which may be a requirement for some embodiments in order to receive the fluid for sensing inside the at least one acoustic cavity, e.g. for the embodiments referred to in FIG. 14 and FIG. 15. Second, the perforations may be used to tune the mechanic resonances (the eigenfrequency spectrum) of the acoustic transducer so that is spectrally overlaps with an acoustic resonance (e.g. a resonance frequency or linewidth) of the at least one acoustic cavity. Perforations may be obtained by laser drilling, also in a wafer process, for which individual acoustic transducers on different dies may be tuned individually based on a preceding wafer-scale characterization of their mechanical resonance behavior, e.g. by drilling more holes.

In alternative embodiments of the invention, the resonances of the deformable mechanical portion of the acoustic transducer, e.g. the membrane, may be adjusted by thinning the mechanical portion, e.g. thinning the thin-walled lid or membrane by polishing, grinding, laser ablation or etching, or by removing excess material. This removeable excess material may be provided in the form of small masses which are arranged on a surface of the mechanical portion, e.g. on the surface of the membrane facing away from the at least one acoustic cavity. This mass loading may be the result of a lithographically pattern defined over this surface, which has been etched in a further step, leaving behind unetched, for example dot-like, material protrusions on that surface. The small masses may later be selectively removed, e.g. by laser trimming, whereby the resonances of individual acoustic transducers are adjusted, e.g. adjusted in a way such that one of the resonances is spectrally overlapping with an acoustic resonance of the at least one acoustic cavity. Again, the lateral dimensions of these little masses may be in a sub-wavelength region for the acoustic signals to be transduced by the acoustic transducer, hence their presence cannot be resolved by the impinging acoustic waves.

In yet alternative embodiments of the invention, the resonances of the deformable mechanical portion of the acoustic transducer, e.g. the membrane, may be actively adjusted by controlled light exposure of a photoresponsive material extending on or over a surface of the deformable portion. For example, a layer of photoresponsive liquid crystal polymers may be provided on a surface of the deformable portion. When the layer of photoresponsive liquid crystal polymers is illuminated, their elastic modulus is affected and the mechanical resonance of the deformable portion is changed.

In yet alternative embodiments of the invention, the resonances of the deformable mechanical portion of the acoustic transducer, e.g. the membrane, may be actively adjusted by controlled electrodeposition. By way of example, document WO2009/064577 A1 (Arizona Board of Regents) May 5, 2009 describes tuning of a diaphragm of a microphone by controlled electrodeposition, e.g. in par. 31-37 therein. According to this document, a multilayered diaphragm comprises a solid electrolyte layer extending between an anode an a cathode, and a mechanical resonance frequency is tuned by a reversable electrodeposition from the anode onto or into the solid electrolyte if a voltage signal applied between the anode and cathode is exceeding a threshold voltage. Electrodeposition refers to phenomena including dendritic growth of metal structures in the electrolyte as well as increasing a concentration of reduced metal or conductive material in the electrolyte, which alter the diaphragms stress bending stiffness and displacement characteristics.

According to some embodiments of the invention the deformable mechanical portion may be planar in an unflexed configuration, e.g. a planar diaphragm at rest. In other embodiments of the invention the deformable mechanical portion may be provided with a corrugated surface, e.g. as a corrugated membrane comprising a plurality of parallel laterally extending grooves or concentric circular grooves. These grooves may be formed and exposed at one of the membrane's surfaces or may be formed in a layer which is surrounded by other material layers. A deformable mechanical portion with a corrugated surface is more sensitive to acoustic waves and may also be used for optical interrogation when being read out, e.g. the corrugated surface acts as a diffractive grating for a probing light beam used for optical readout of the acoustic transducer (membrane) displacements. A flexing corrugated membrane surface, for example, will lead to a change in the diffracted light pattern which is observed for the probing light beam.

Acoustic transducers, in embodiments of the present invention, are not limited to deformable thin-walled lids such as a vibrating membrane or plate, but may also include other mechanical arrangements that deform under the action of incident pressure waves as generated by at least one of the acoustic cavities. Another non-limiting example for an acoustic transducer may be a thin cantilever or flat sheet, which bend under the force of pressure waves reflecting off the cantilever or sheet surface facing the acoustic cavity. Likewise, the material of the acoustic transducer is not limited to silicon nitride, but may be implemented or may be comprising a piezo-resistive material (e.g. silicon, aluminum nitride) or a piezo-electric material (e.g. silicon oxide, aluminum nitride). A layer of piezo-resistive material that is deformable or part of a bigger structure that is deformable under the action of pressure waves incident thereon enables a readout system for the photoacoustic transducer that may take advantage of the variable resistance of such layer when deformed. For instance, a readout system for the photoacoustic transducer may sense the resulting variable currents if the piezo-resistive material layer is connected to a constant voltage source, a magnitude of the changing current being related to the displacement of the deformed layer. Alternatively, a readout system for the photoacoustic transducer may sense a varying voltage if the piezo-resistive material layer is arranged to be one part of a voltage divider. A layer of piezo-electric material that is deformable or part of a bigger structure that is deformable under the action of pressure waves incident thereon enables a readout system for the photoacoustic transducer that may take advantage of the variable charge that is generated on such layer when deformed. For instance, a readout system for the photoacoustic transducer may sense the resulting variable charges on the piezo-electric layer of the acoustic transducer capacitively, a magnitude of the changing charges being related to the displacement of the deformed layer. In such embodiments, the deformable piezo-electric layer, e.g. a deformable membrane, may be configured as a first electrode of a capacitor, whereas a fixed, rigid second electrode of the capacitor is located in proximity to the first deformable electrode, e.g. the second electrode is an electrode arranged on a rigid anchor of the deformable acoustic transducer and close to the acoustic cavity, or the second electrode is arranged as a ring electrode around the circular opening of an acoustic cavity covered by a deformable lid such that a small gap exists between the first and the second electrode.

Furthermore, the acoustic transducer is not limited to the illustrative embodiments described above. In an alternative embodiment, for instance, the acoustic transducer may be provided as a microphone implemented in microelectromechanical system (MEMS) technology, e.g. a MEMS microphone. For this particular embodiment, the MEMS microphone may be secured, e.g. bonded, onto the photonic chip (e.g. a die cut from a wafer) such that the membrane of the MEMS microphone is fixedly positioned above an opening of the at least one acoustic cavity. The bonding of the MEMS microphone, which may be carried out as a wafer process, still results in an integrated device structure for the photoacoustic transducer. There may exist a small air gap (e.g. less than a millimeter) between the membrane of the so integrated MEMS microphone and the at least one acoustic cavity. However, such a small air gap does not impair its quality to reflect acoustic waves originating from the at least one acoustic cavity back into the same, e.g. the membrane of the so integrated MEMS microphone is still in direct acoustic communication with the at least one acoustic cavity. Moreover, the membrane of the so integrated MEMS microphone may be in direct acoustic communication with more than one acoustic cavity, e.g. it may be positioned above a plurality of holes in a photonic crystal structure of the waveguide, which all act as acoustic cavities. It is an advantage of embodiments of the invention which provide an integrated MEMS microphone as acoustic transducer that these MEMS microphones are very sensitive, pressure-sensing devices. Additionally, their mechanical resonance frequencies often can be tuned very precisely, which allows for a spectral overlap of a mechanical resonance frequency of the MEMS microphone with one of the acoustic resonances (spectral resonance lines) of the at least one acoustic cavity. The resonance frequency tuning may be performed as part of a calibration procedure so that the mechanical resonance is pre-adjusted to overlap with an acoustic resonance of the at least one acoustic cavity when the photoacoustic transducer is used for concentration sensing of the species. Alternatively or additionally, the resonance frequency tuning may be performed during concentration sensing of the species by the photoacoustic transducer. Then the adjustment of the mechanical resonance is performed actively during sensing, e.g. as a step of the sensing method, resulting in a spectral overlap between the mechanical resonance and the acoustic resonance of the at least one acoustic cavity. An example of tuning the mechanical resonance frequency of a MEMS microphone by capacitive actuation is described in the document U.S. Pat. No. 8,723, 277 B2 (Dehe et al.) May 13, 2014, e.g. in columns four to five therein. According to this document, the electrodes of a membrane are segmented into a first and a second group, both movable with respect to a backplate electrode. The first electrode group can be a ring-shaped outer electrode configuration for capacitively actuating the membrane into a bias position, and the second electrode group can be a circular inner electrode configuration for capacitive sensing of deflections of at least the inner membrane portion with respect to the bias position. The bias position influences the strain exerted on the membrane; hence, in response, a tensile stress builds up in the membrane which influences the membranes mechanical resonance.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. For instance, referring to FIG. 10, an alternative embodiment of a photoacoustic transducer is shown, in which the waveguide structure 501 comprises reflecting means 102 arranged on each side of a propagation region 103 of an optical resonator formed within the waveguide structure 501. The reflecting means 102 are provided as distributed Bragg gratings 505, e.g. by providing a periodic structure for a surface relief (e.g. groves) of the waveguide structure 501. A standing wave of a resonant radiation field is extending into an acoustic cavity 506 when the photoacoustic transducer is operating. For this particular embodiment, the acoustic cavity 506 is implemented as a hole with an elliptical opening and is covered with a deformable thin-walled lid at one of its bases.

Figure 11:
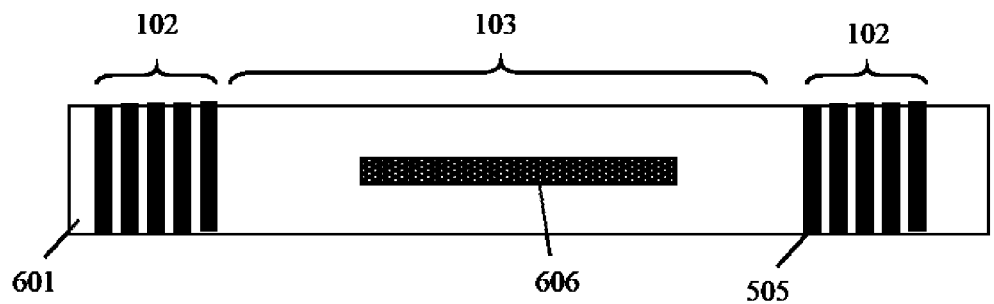
FIG. 11 is a schematic of an integrated photoacoustic transducer including a rectangular acoustic cavity, according to an embodiment of the present invention.

FIG. 11 is showing another embodiment of a photoacoustic transducer, in which the waveguide structure 601 comprises reflecting means 102 arranged on each side of a propagation region 103 of an optical resonator formed within the waveguide structure 601. The reflecting means 102 are provided as distributed Bragg gratings 505, e.g. by providing a periodic structure for a surface relief (e.g. groves) of the waveguide structure 601. A standing wave of a resonant radiation field is extending into an acoustic cavity 606 when the photoacoustic transducer is operating. For this particular embodiment, the acoustic cavity 606 is implemented as an elongated slot with a rectangular opening and is covered with a deformable thin-walled lid at one of its bases.

Figure 12:
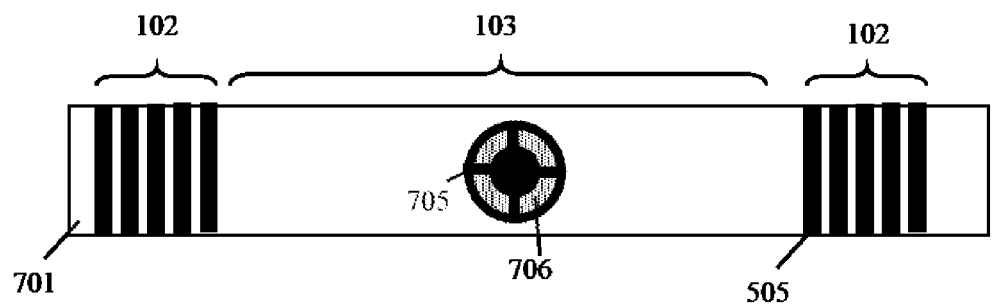
FIG. 12 is a schematic of an integrated photoacoustic transducer including a circular acoustic cavity and a suspended-disk acoustic transducer, according to an embodiment of the present invention.

FIG. 12 is illustrating yet another embodiment of a photoacoustic transducer, in which the waveguide structure 701 comprises reflecting means 102 arranged on each side of a propagation region 103 of an optical resonator formed within the waveguide structure 701. The reflecting means 102 are provided as distributed Bragg gratings 505, e.g. by providing a periodic structure for a surface relief (e.g. groves) of the waveguide structure 701. A standing wave of a resonant radiation field is extending into an acoustic cavity 706 when the photoacoustic transducer is operating. For this particular embodiment, the acoustic cavity 706 is implemented as hole with a circular opening. An acoustic transducer 705 is mechanically coupled to the waveguide structure 701 by a plurality of narrow tethers supporting a thin deformable disk above a circular opening of the acoustic cavity 706 in such a way that it cooperates with the acoustic cavity 706 in providing a partial, reflective boundary for pressure waves generated inside the acoustic cavity 706. To this end, the thin deformable disk may overlap with a substantial area of the circular opening (e.g. more than 70% overlap). A second base of the hole, away from the deformable disk, may be covered.

Figure 13:
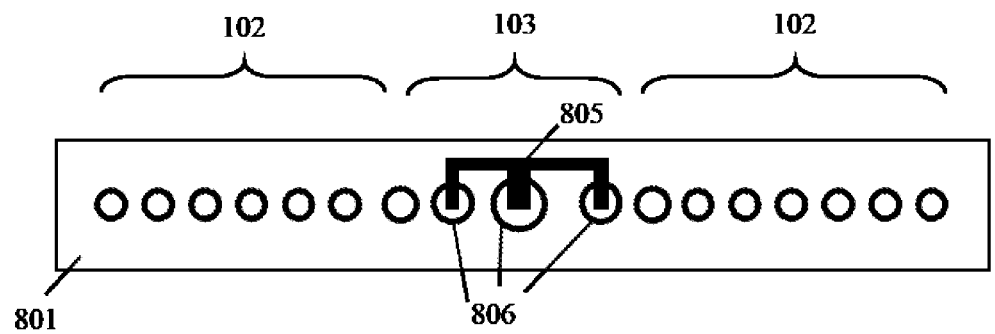
FIG. 13 is a schematic of an integrated photoacoustic transducer including three circular acoustic cavities and an acoustic transducer comprising three cantilevers, according to an embodiment of the present invention.

FIG. 13 is depicting an embodiment of a photoacoustic transducer, in which the waveguide structure 801 comprises reflecting means 102 arranged on each side of a propagation region 103 of an optical resonator formed within the waveguide structure 801. The reflecting means 102 are provided as a sequence of defects, e.g. by providing a periodic photonic crystal structure comprising a plurality of hole defects formed within the waveguide structure 801. Such photonic crystal structure may be tapered, for instance, by gradually increasing a hole radius, whereby photonic leakage losses for the propagation region 103 are reduced. A standing wave of a resonant radiation field is extending into a plurality (e.g. three) of acoustic cavities 806 when the photoacoustic transducer is operating. For this particular embodiment, the three consecutive acoustic cavities 806 are implemented as holes with a circular opening, each being in acoustic communication with an elongated, thin cantilever. The three cantilevers are positioned above the respective openings of the acoustic cavities 806 in such a way that they cooperate with the acoustic cavities 806 in providing a partial, reflective boundary for pressure waves generated therein. The three cantilevers may be mechanically connected to each other on one end and to a portion of the waveguide structure 801, forming a larger acoustic transducer 805. Alternatively, each cantilever may be isolated from the others and may be individually coupled to a different portion of the waveguide structure 801; this leads to three independently operating acoustic transducers.

FIG. 14 is showing an alternative embodiment of an acoustic cavity 906 formed inside the waveguide structure of the photoacoustic transducer. Such acoustic cavity 906 may have lateral sidewalls comprising waveguide material 204 and may be of cylindrical shape. For this particular embodiment, the acoustic cavity 906 comprises a first deformable thin-walled lid 407 covering one end entirely and a second lid 408 covering the opposite end. The second lid may also be thin-walled and deformable. Moreover, the second lid 408 may be implemented as a permeable or semi-permeable membrane comprising one or more perforations such that the acoustic cavity 906 is still adapted for receiving a fluid for sensing.

Figure 15:
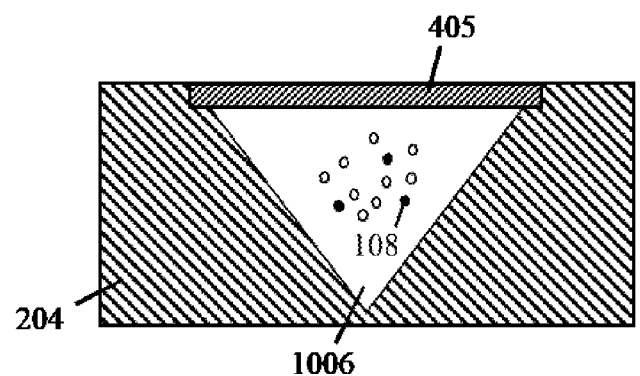
FIG. 15 is a cross-section of an acoustic cavity of an integrated photoacoustic transducer, which is of conical shape and closed at both ends, according to an embodiment of the present invention.

FIG. 15 is showing another embodiment of an acoustic cavity 1006 formed inside the waveguide structure of the photoacoustic transducer. Such acoustic cavity 1006 may have slanted lateral sidewalls comprising waveguide material 204 and may be of a conical shape with only one circular opening at its base. This base is at least partially covered with a thin-walled and deformable lid 405, which may also be permeable or semi-permeable in respect of a fluid for sensing.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An integrated photoacoustic transducer for assisting in sensing a concentration of a species in a fluid, the species interacting with radiation by absorption in at least one spectral region, comprising:
   a waveguide structure configured as an optical resonator for enhancing a received radiation signal modulated at a modulation frequency, the waveguide structure having at least one associated optical resonance spectrally overlapping with one of said spectral regions of absorption of radiation by said species,
   at least one acoustic cavity formed in a portion of the waveguide structure and configured to receive the fluid for sensing comprising said species at said concentration so that the fluid can be heated by irradiating it with said enhanced radiation signal, thereby generating an acoustic signal, the at least one acoustic cavity having at least one associated acoustic resonance spectrally overlapping with a harmonic of the modulation frequency,
   at least one acoustic transducer comprising a deformable mechanical portion, the deformable mechanical portion being in direct acoustic communication with the at least one acoustic cavity and having an associated mechanical resonance, the mechanical resonance being adjusted, or the at least one acoustic transducer being configured to allow adjusting of the mechanical resonance over a spectral range, to spectrally overlap with an acoustic resonance associated with the at least one acoustic cavity when the photoacoustic transducer is in use for assisting in sensing said concentration of said species.

2. The photoacoustic transducer according to claim 1, wherein the deformable mechanical portion of the at least one acoustic transducer is mechanically coupled to the at least one acoustic cavity such that it delimits a portion of its boundary, or wherein the deformable mechanical portion of the at least one acoustic transducer forms part of a microphone implemented in a microelectro-mechanical system technology, the microphone being fixedly secured with respect to the at least one acoustic cavity.

3. The photoacoustic transducer according to claim 2, wherein the deformable mechanical portion of the at least one acoustic transducer comprises a membrane.

4. The photoacoustic transducer according to claim 1, wherein a radiation window used for sensing species in the fluid comprises radiation in the terahertz region.

5. The photoacoustic transducer according to claim 1, wherein the waveguide structure comprises distributed reflectors arranged at opposite ends thereof.

6. The photoacoustic transducer according to claim 5, wherein the distributed reflectors are provided as a photonic crystal structure comprising a plurality of defects, each being formed in the waveguide structure.

7. The photoacoustic transducer according to claim 6, wherein the waveguide structure is configured as an optical resonator by combining two photonic crystal structures to form a photonic crystal cavity.

8. The photoacoustic transducer according to claim 6, wherein at least one of the plurality of defects is provided as a cavity being coincident with the at least one acoustic cavity.

9. The photoacoustic transducer according to claim 1, wherein the waveguide structure is an at least partially suspended waveguide structure, or a waveguide structure supported by a membrane.

10. The photoacoustic transducer according to claim 1, wherein the waveguide structure is a tapered waveguide structure.

11. The photoacoustic transducer according to claim 1, wherein the waveguide structure is implemented in a high-resistance silicon layer of a substrate.

12. The photoacoustic transducer according to claim 1, wherein the deformable mechanical portion of the at least one acoustic transducer is implemented in a silicon nitride layer, or in an aluminum nitride layer of a substrate.

13. The photoacoustic transducer according to claim 1, wherein the deformable mechanical portion of the at least one acoustic transducer comprises a layer of piezo-resistive or piezo-electric material.

14. The photoacoustic transducer according to claim 1, wherein the at least one acoustic transducer comprises removable, pre-formed mass redistribution structures on a surface of the deformable portion.

15. The photoacoustic transducer according to claim 1, wherein the deformable mechanical portion of the at least one acoustic transducer is configured for active frequency tuning of the associated mechanical resonance.

16. The photoacoustic transducer according to claim 1, wherein the at least one acoustic transducer is comprising at least two deformable membranes, each being mechanically coupled to an opposite end portion of a same acoustic cavity and arranged for being displaced along opposite directions upon receiving the acoustic signal generated in that acoustic cavity, thereby providing acoustic background rejection means.

17. The photoacoustic transducer according to claim 1, comprising at least two acoustic cavities and at least two acoustic transducers, each acoustic transducer comprising a deformable membrane mechanically coupled to an end portion of a corresponding acoustic cavity, said end portions being opposite to each other for the two deformable membranes, the two acoustic cavities acoustic cavities being separated by a distance substantially smaller than a wavelength of an acoustic signal at an acoustic resonance frequency and the two acoustic cavities having associated substantially spectrally overlapping acoustic resonances, the two deformable membranes being arranged for being displaced along opposite directions upon receiving the acoustic signals generated in the respective acoustic cavities, thereby providing acoustic background rejection means.

18. A photoacoustic sensing system for sensing a species in a fluid, comprising:
at least one integrated photonics photoacoustic transducer according to claim 1,
a radiation source in optical communication with the waveguide structure of each integrated photonics photoacoustic transducer,
a modulator for modulating a radiation signal delivered by the radiation source,
readout circuitry for detecting a mechanical deformation of the deformable mechanical portions of each acoustic transducer.

19. The photoacoustic sensing system according to claim 18, wherein the readout circuitry comprises a voltage sensing circuit and/or an optical displacement sensor.

20. The photoacoustic sensing system according to claim 18, wherein the radiation source comprises a photomixing unit.

21. The photoacoustic sensing system according to claim 18, wherein the radiation source comprises an optical rectification unit.

22. The photoacoustic sensing system according to claim 18, wherein the radiation source comprises a laser emitting at a wavelength in the terahertz region.

23. A photoacoustic absorption spectroscopy method for sensing concentrations of a species in a fluid, comprising:
providing an integrated photoacoustic transducer according to claim 1,
providing the at least one acoustic cavity formed in the waveguide structure of the integrated photoacoustic transducer with at least one fluid comprising a species at a concentration to be sensed,
generating a radiation signal modulated at a modulation frequency and directing it to the waveguide structure of the integrated photoacoustic transducer for receiving the modulated radiation signal,
detecting an enhanced amplitude of a signal corresponding to a mechanical displacement or deformation of the mechanical portion of the at least one acoustic transducer of the integrated photoacoustic transducer, and
deriving a concentration value for the sensed species in the fluid, based on the detected, enhanced amplitude signal.

* * * * *